United States Patent [19]

Poon

[11] Patent Number: 5,257,218
[45] Date of Patent: Oct. 26, 1993

[54] PARALLEL CARRY AND CARRY PROPAGATION GENERATOR APPARATUS FOR USE WITH CARRY-LOOK-AHEAD ADDERS

[75] Inventor: Jack T. Poon, Fremont, Calif.
[73] Assignee: Intel Corporation, Santa Clara, Calif.
[21] Appl. No.: 13,256
[22] Filed: Feb. 3, 1993

Related U.S. Application Data

[63] Continuation of Ser. No. 820,304, Jan. 6, 1992, abandoned.

[51] Int. Cl.⁵ .................................................. G06F 7/50
[52] U.S. Cl. ........................................ 364/787; 364/788
[58] Field of Search ................................. 364/787-788

[56] References Cited

U.S. PATENT DOCUMENTS

| | | | |
|---|---|---|---|
| 4,623,981 | 11/1986 | Wolrich et al. | 364/787 X |
| 4,682,303 | 7/1987 | Uya | 364/788 |
| 4,882,698 | 11/1989 | Young | 364/787 X |
| 5,018,093 | 5/1991 | Shih | 364/788 X |
| 5,122,982 | 6/1992 | Cohn | 364/787 |

OTHER PUBLICATIONS

Waser et al, "Introduction to Arithmetic for Digital Designers", Rinehart and Winston, 1982, pp. 77-88.

*Primary Examiner*—Tan V. Mai
*Attorney, Agent, or Firm*—Blakely, Sokoloff, Taylor & Zafman

[57] ABSTRACT

A parallel carry and carry propagation generator for use with a modulo-2 N-bit operand adder generates the required carry bits to complete the N-bit pair modulo-2 sums as a parallel operation. The logic structure has $\log_2 2N$ operation levels that allow for constant fan-in and fan-out design as well as static, rather than fixed-rate precharge/discharge, operation. A simplified version of the network is also suitable for use as a conditional sum selection controller for a conditional sum adder.

11 Claims, 19 Drawing Sheets

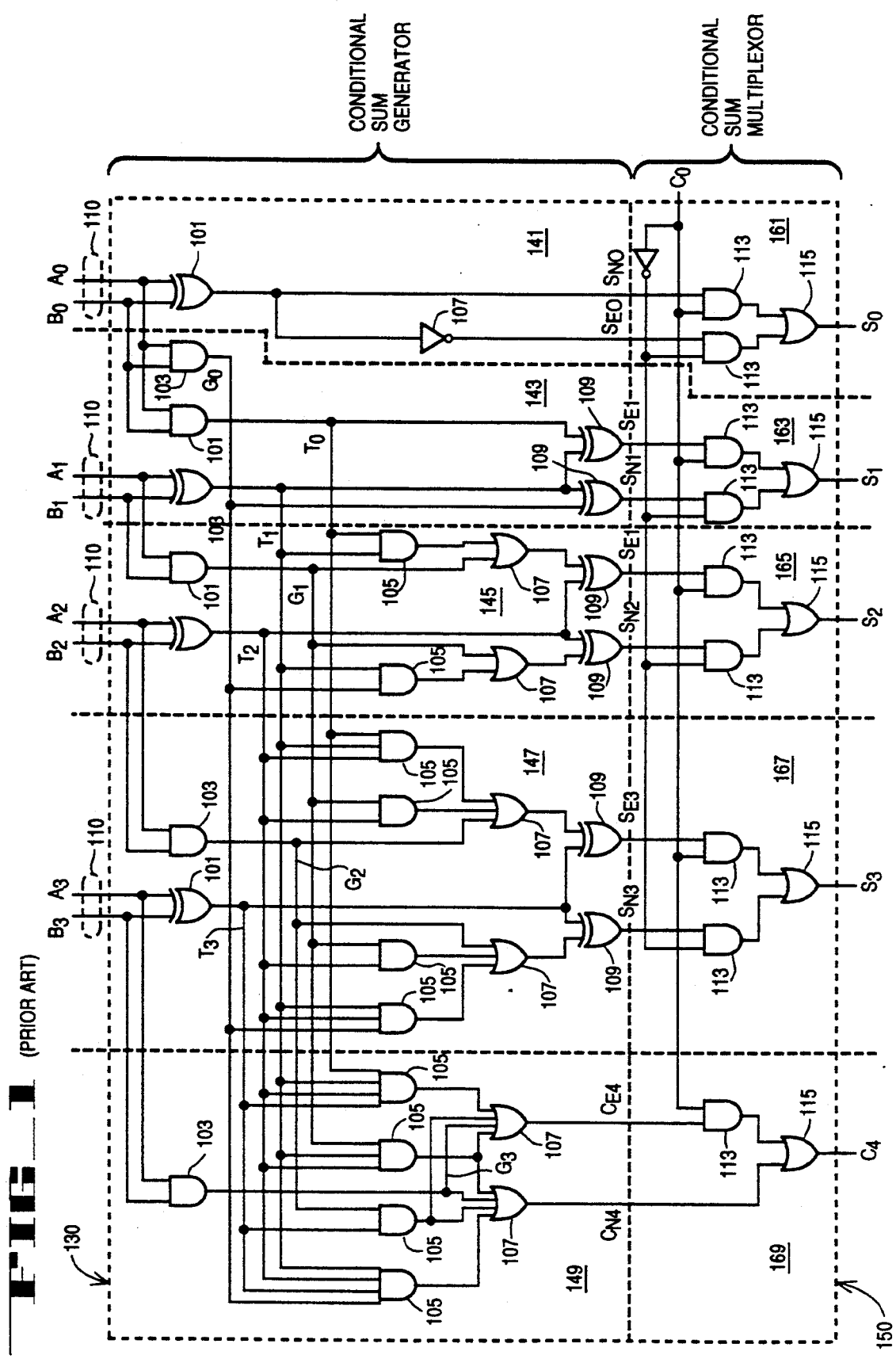
FIG_1 (PRIOR ART)

FIG_2 (PRIOR ART)
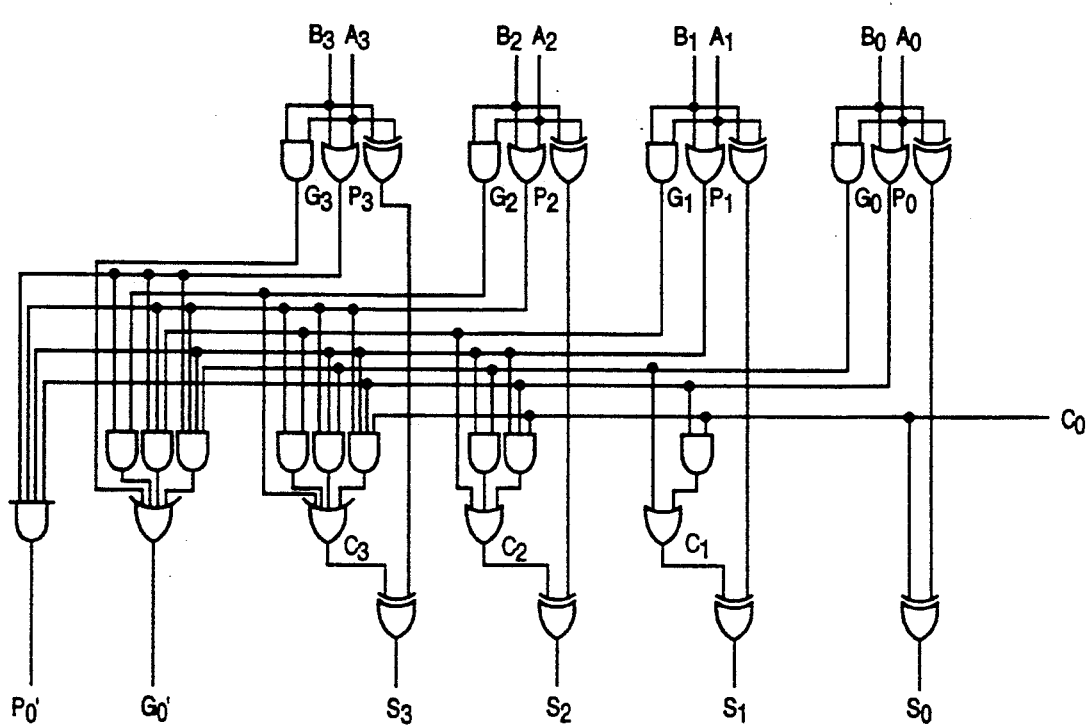
FIG_3 (PRIOR ART)
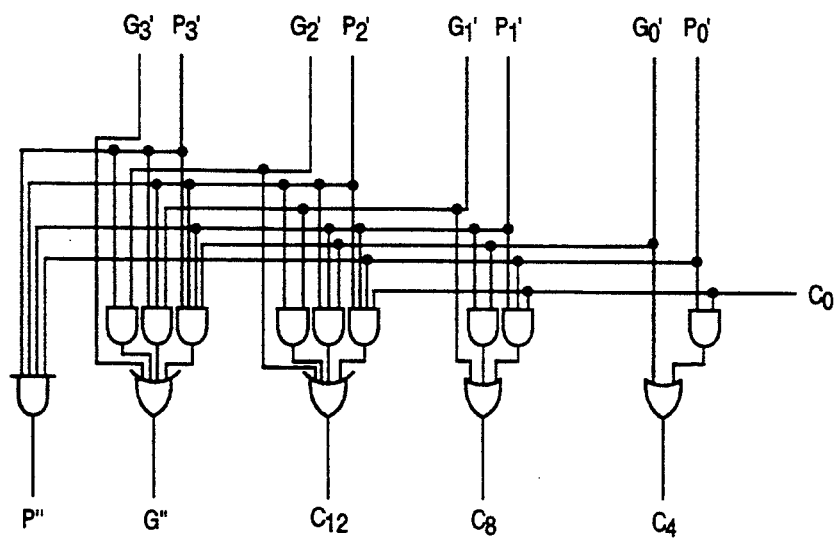

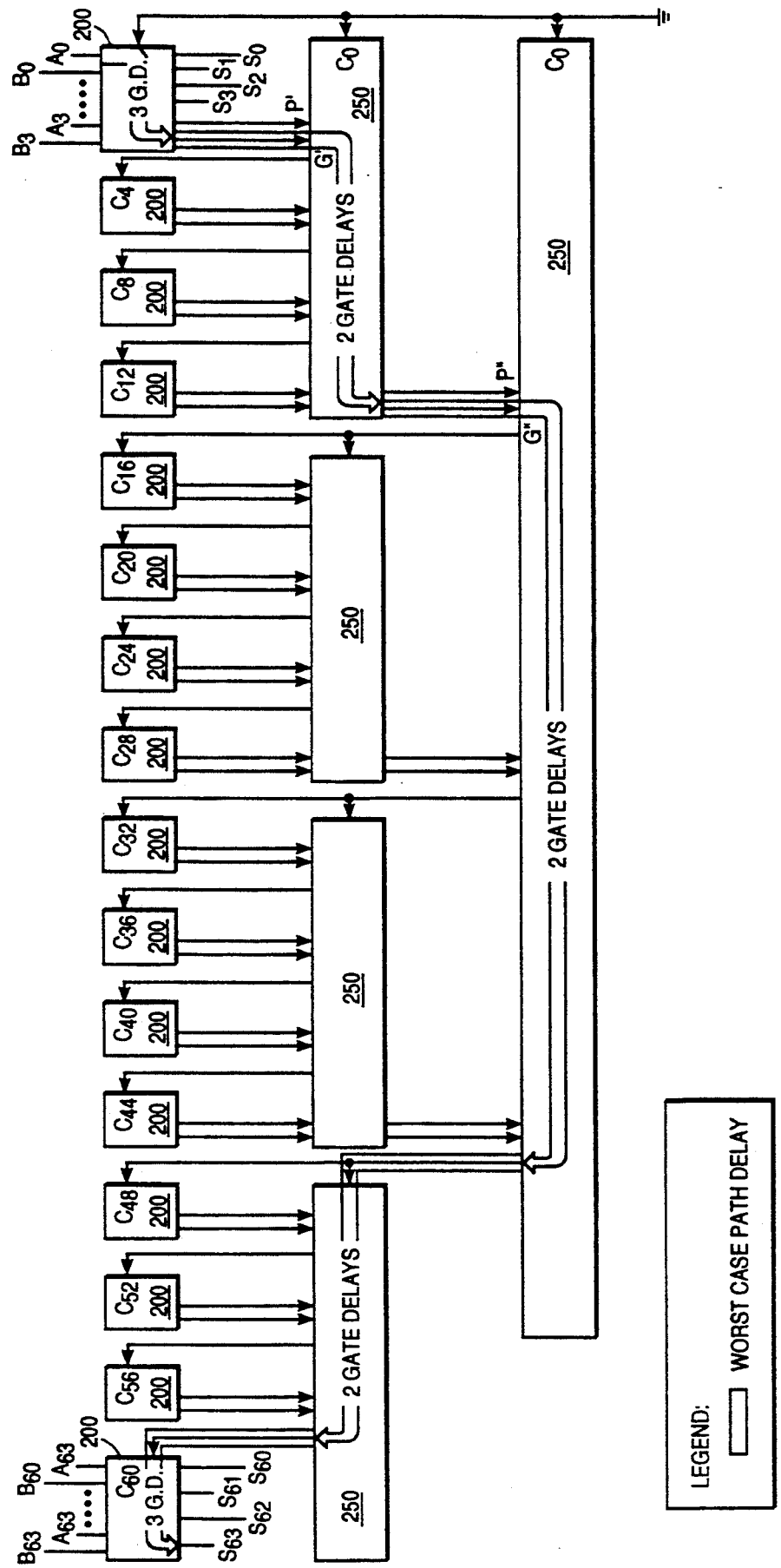
FIG_4 (PRIOR ART)

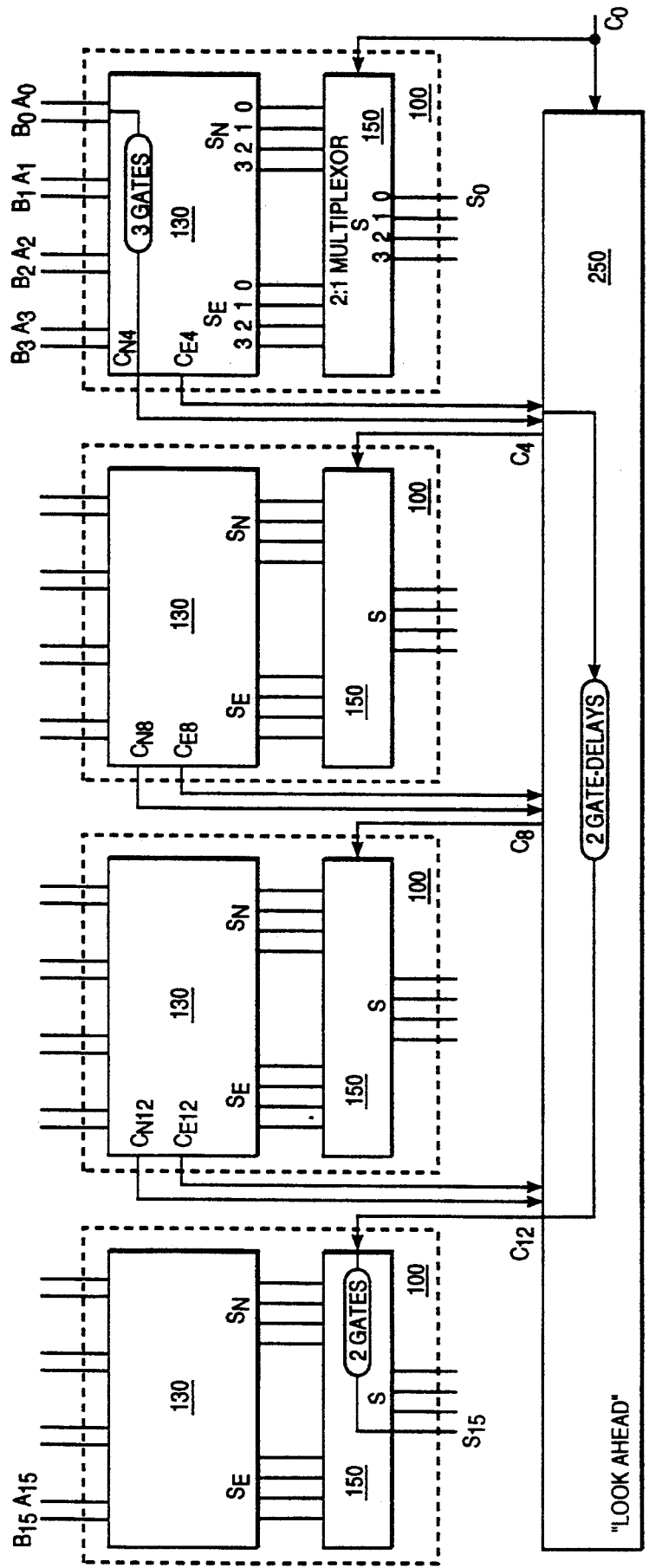
FIG_5 (PRIOR ART)

FIG_6
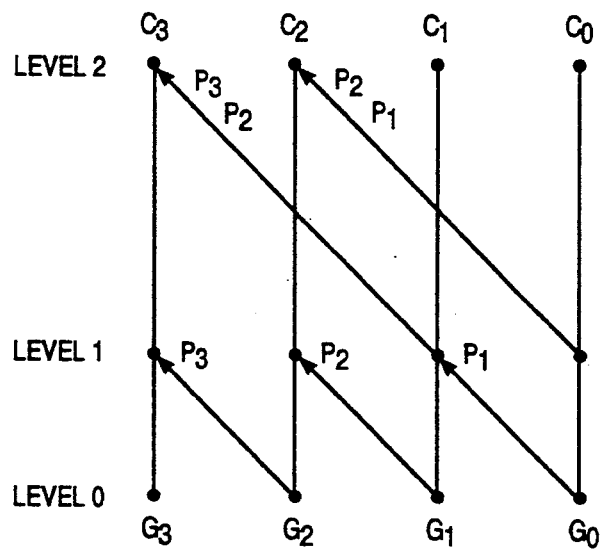
FIG_7
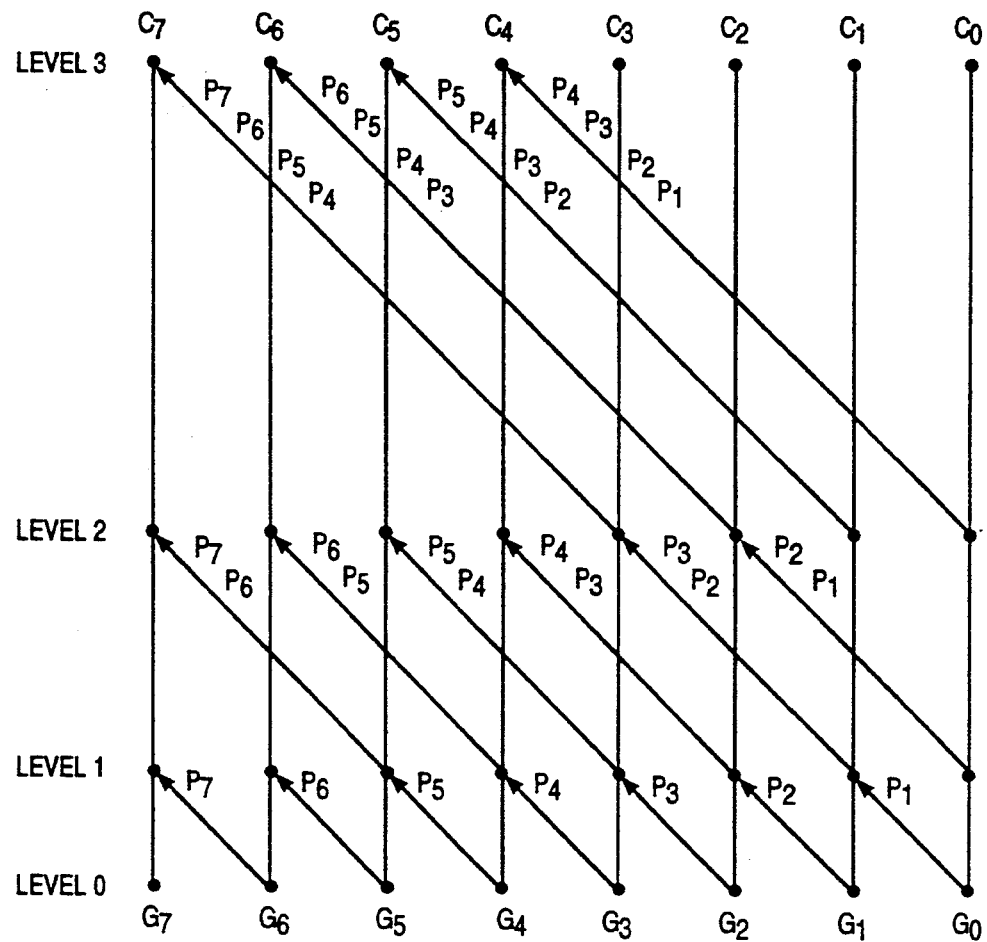

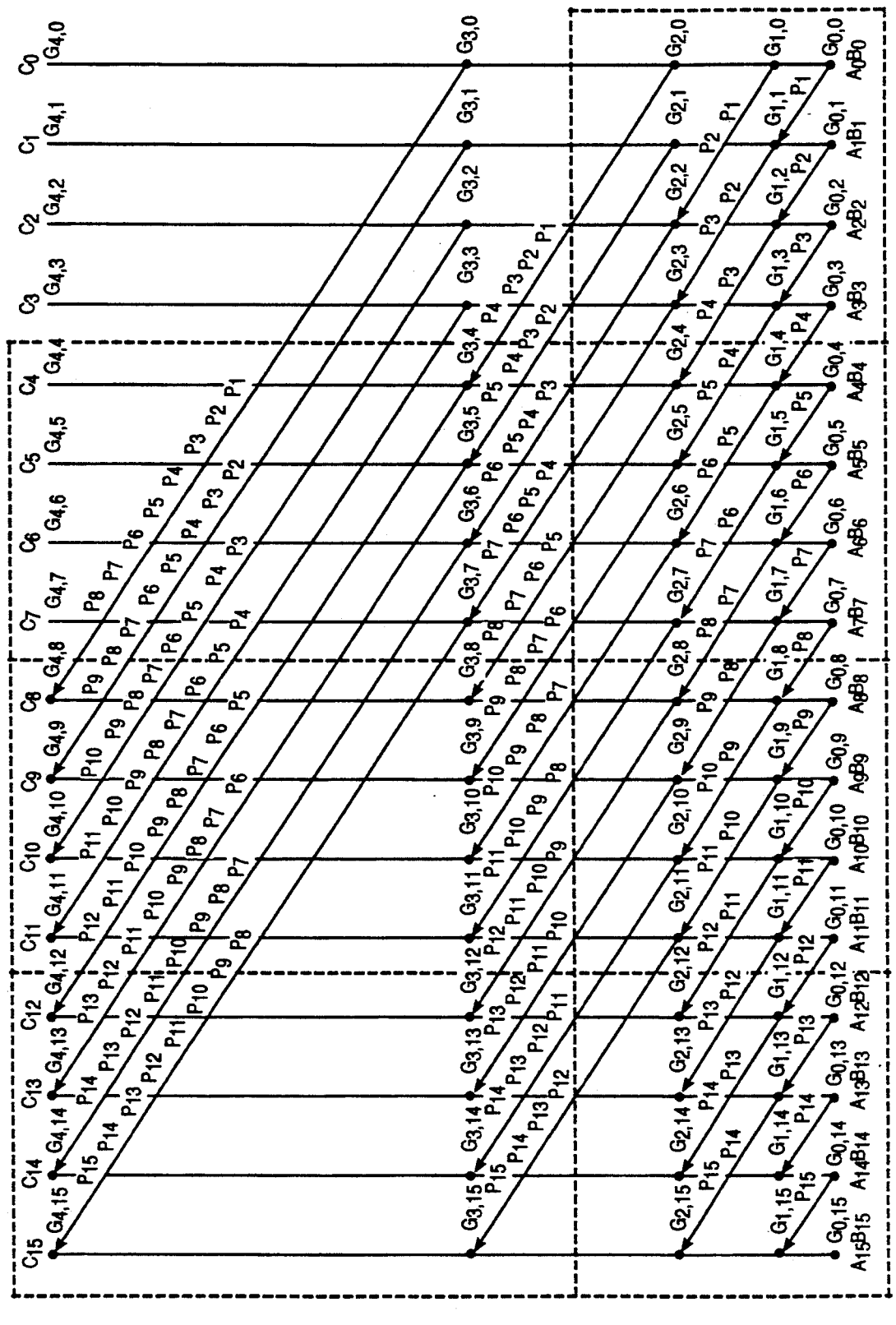

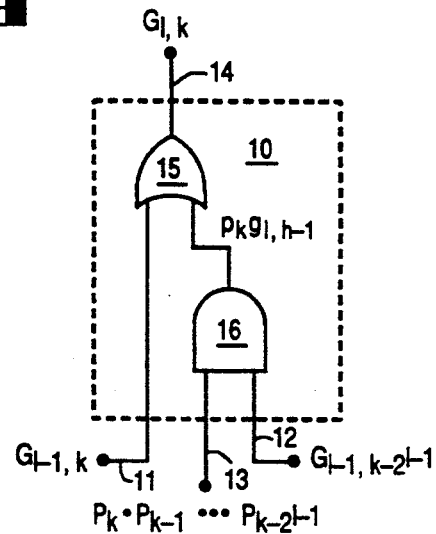
FIG_9
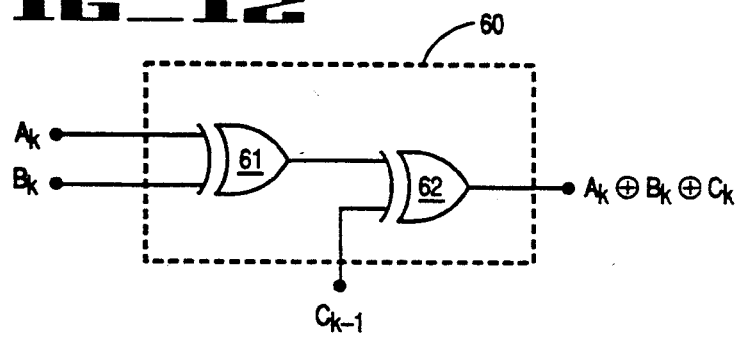
FIG_12
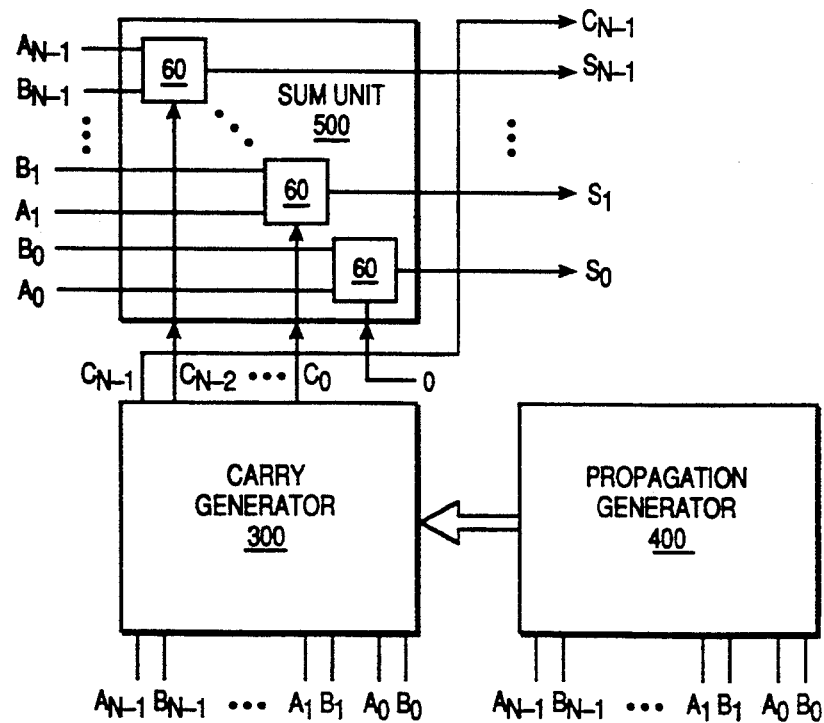
FIG_13

FIG_10

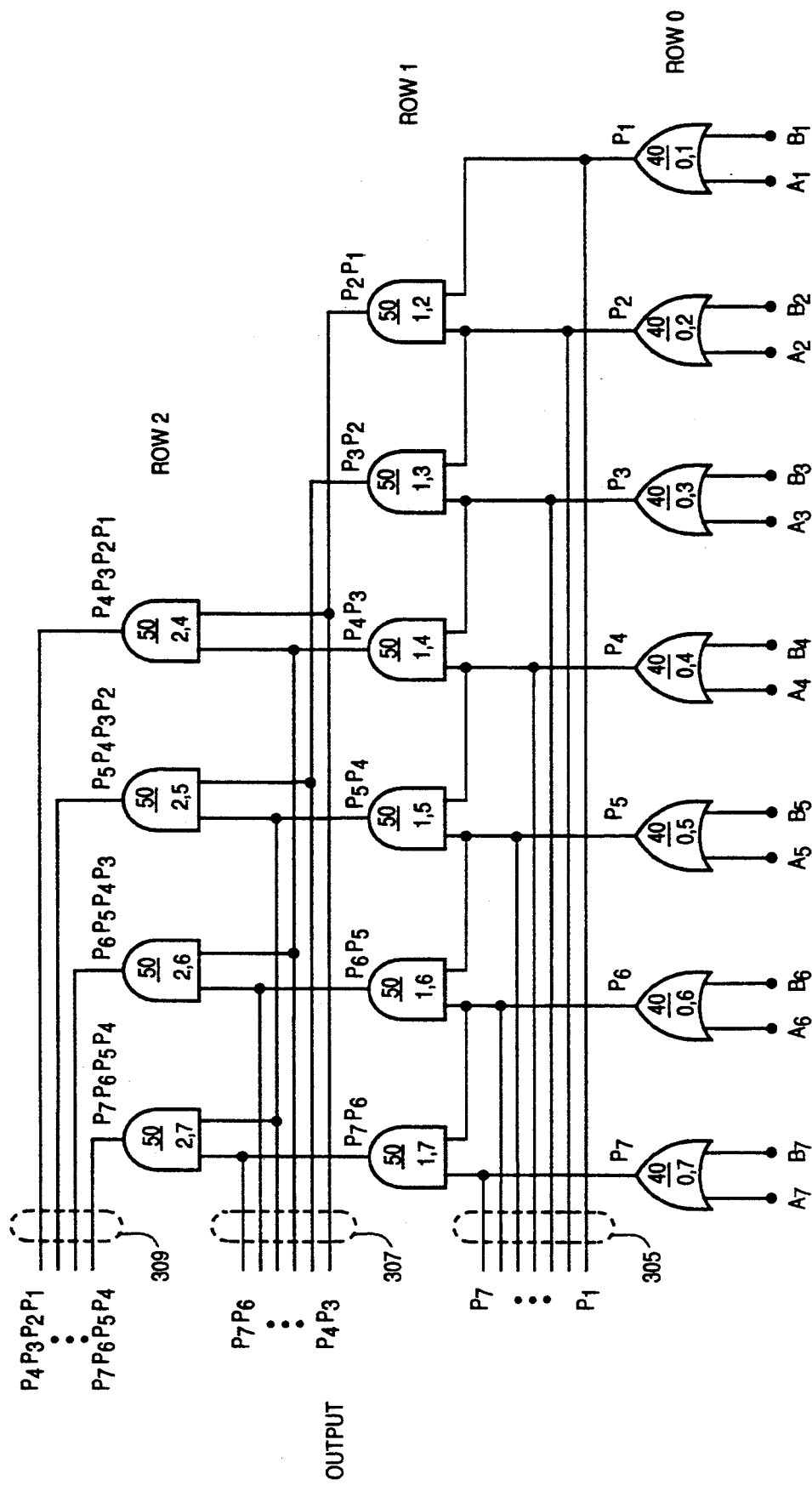
FIG_11

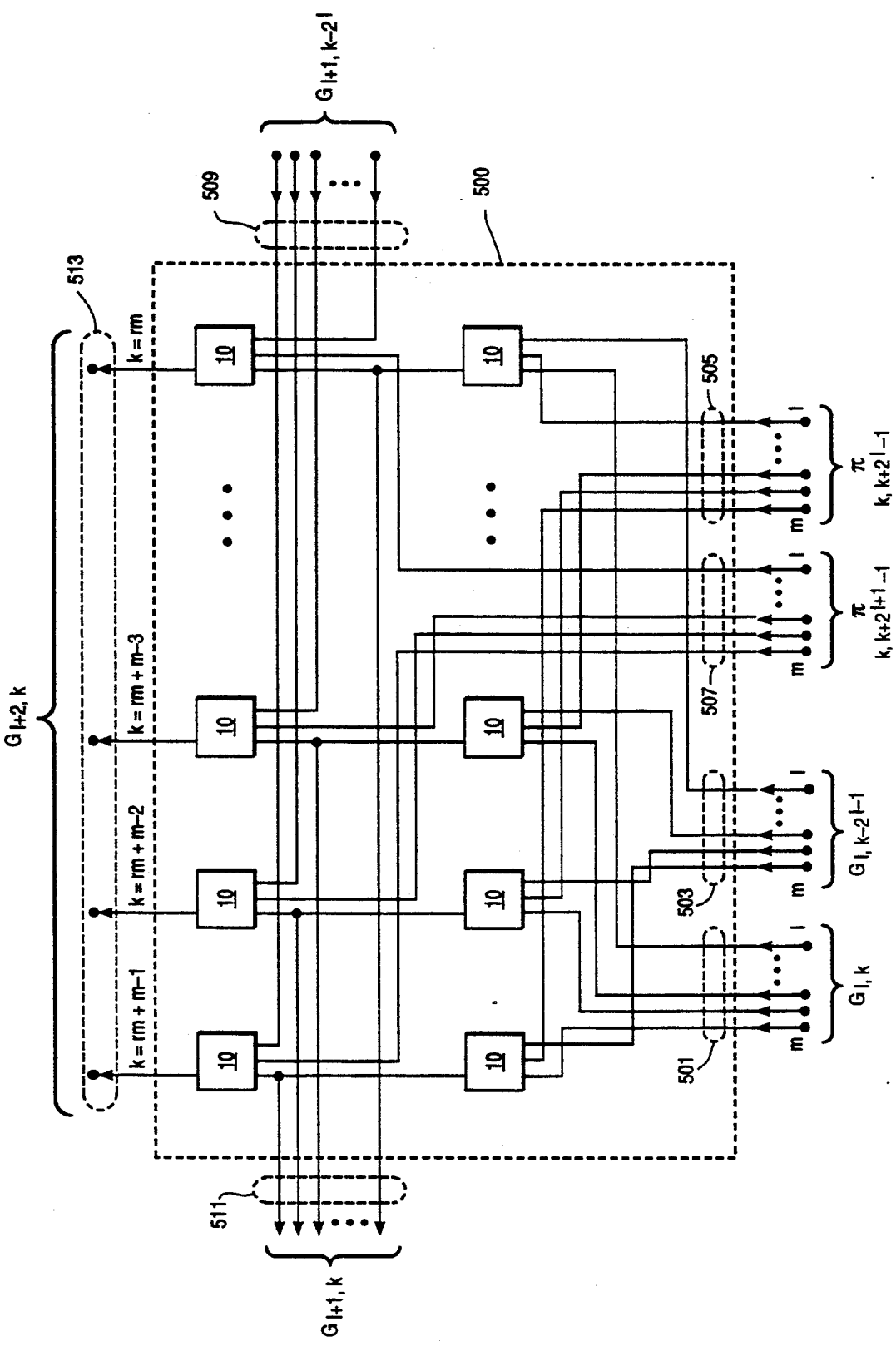
FIG_14

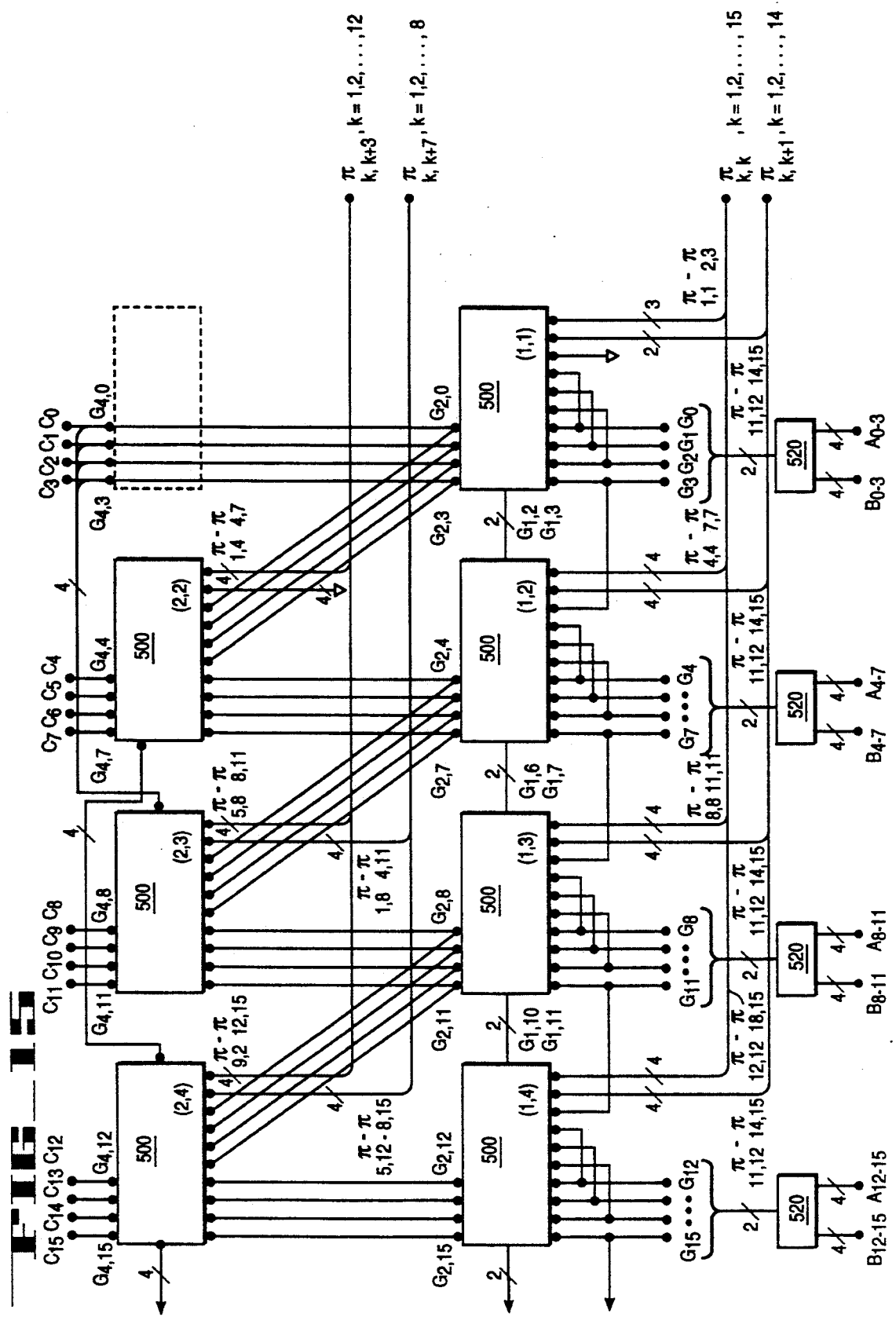
FIG__15

FIG_16

$$G_2 = P_2(16) \cdot P_1(16) \cdot G_0$$

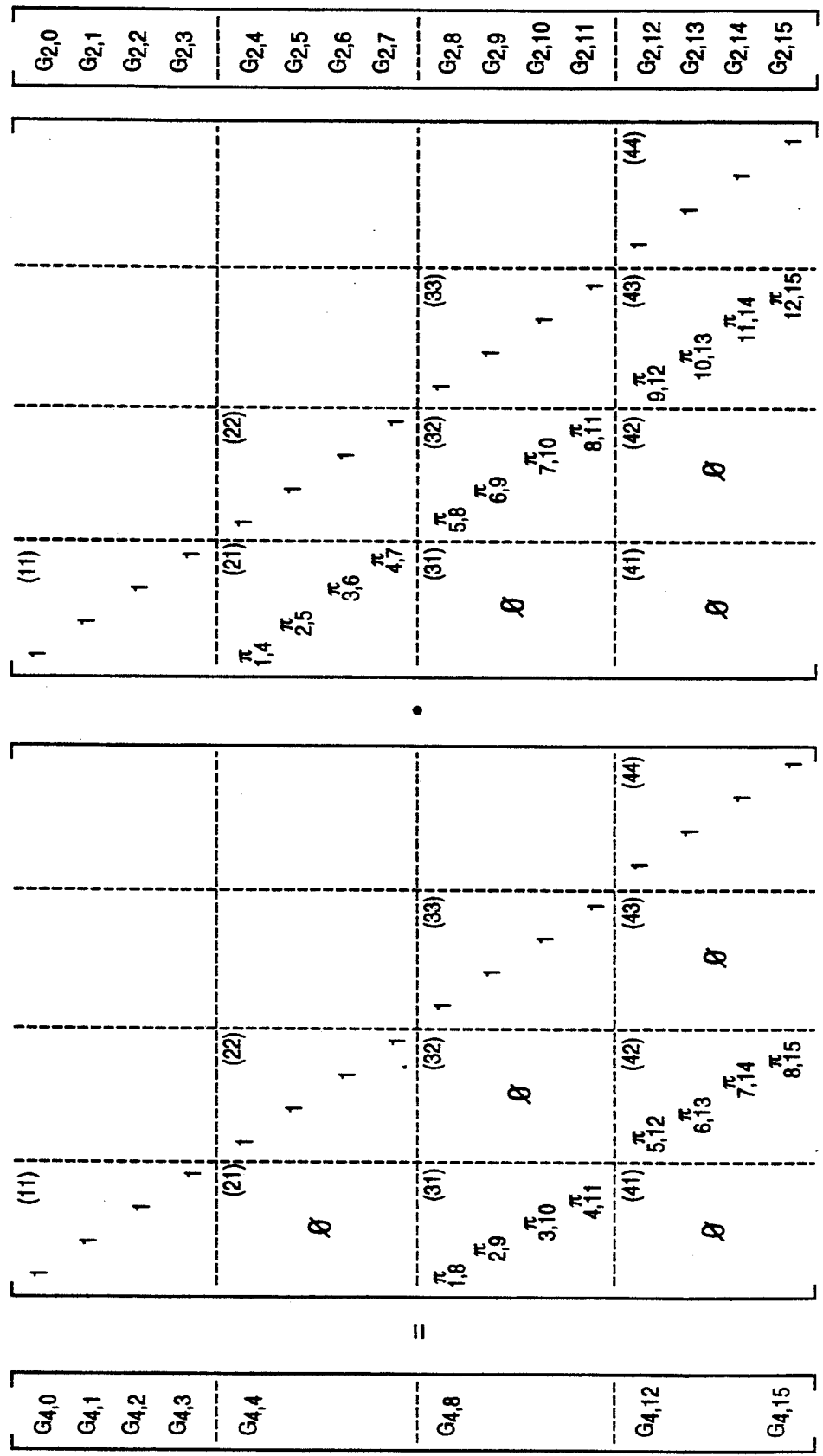

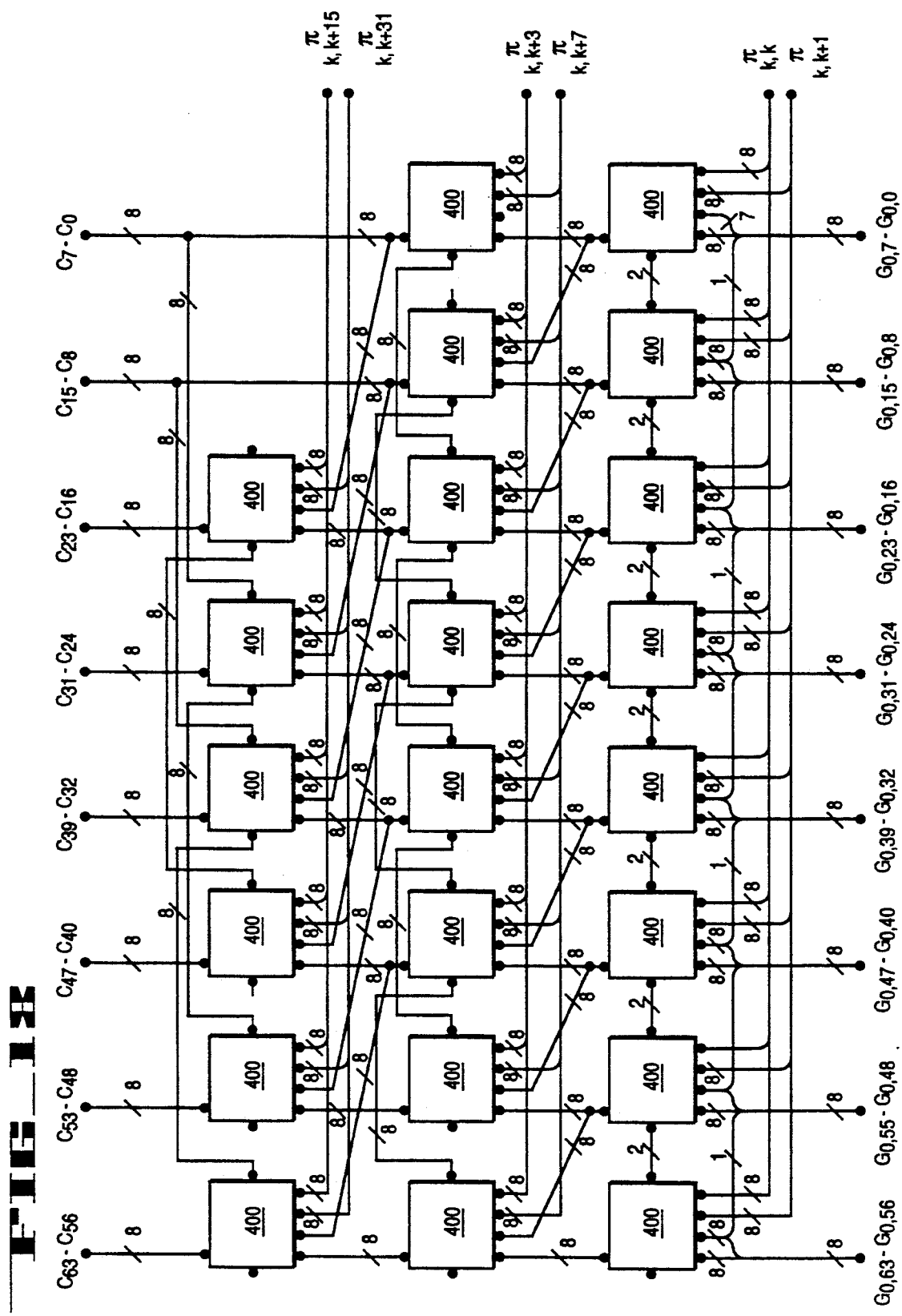
FIG_1K

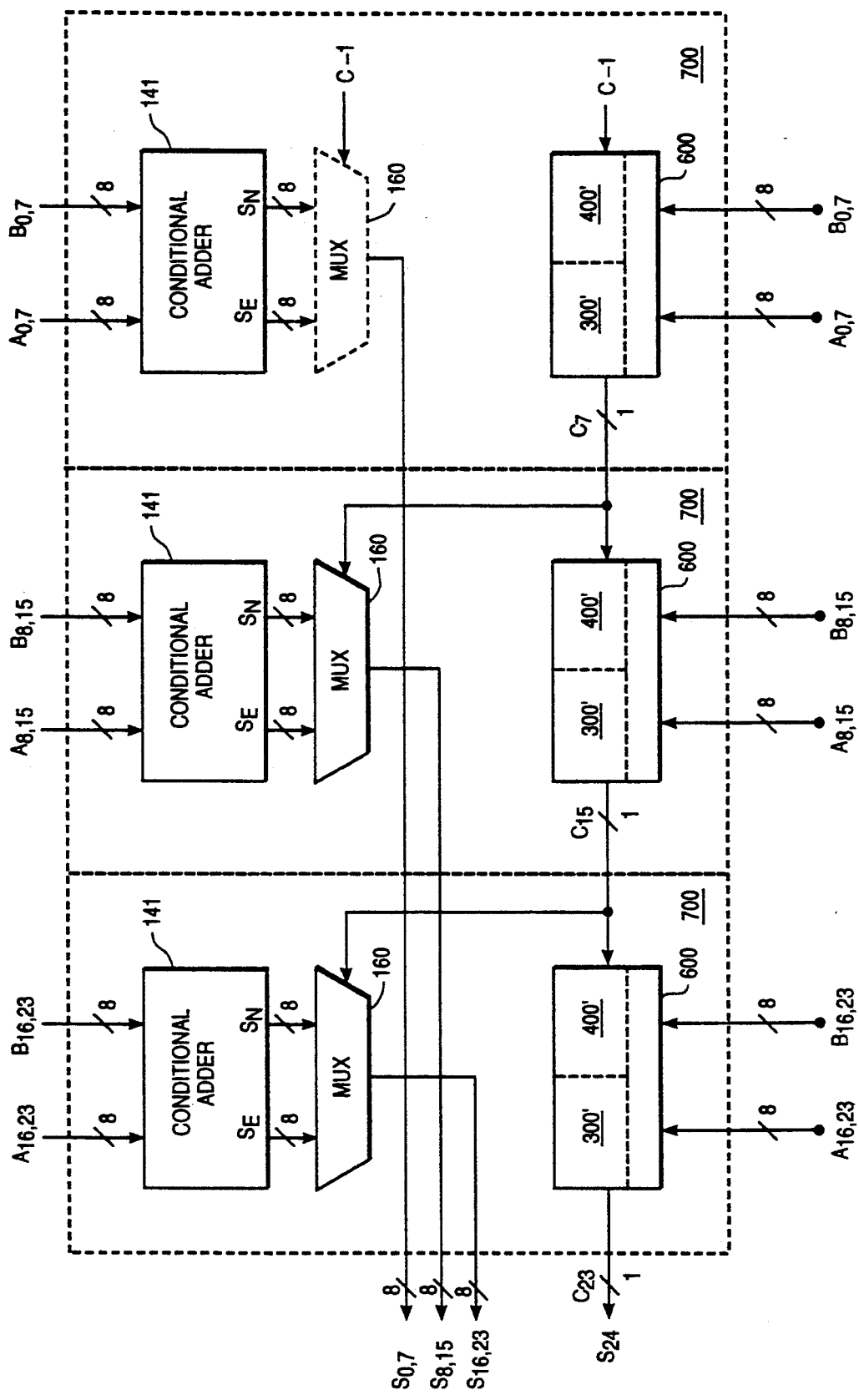
FIG_19

FIG_20
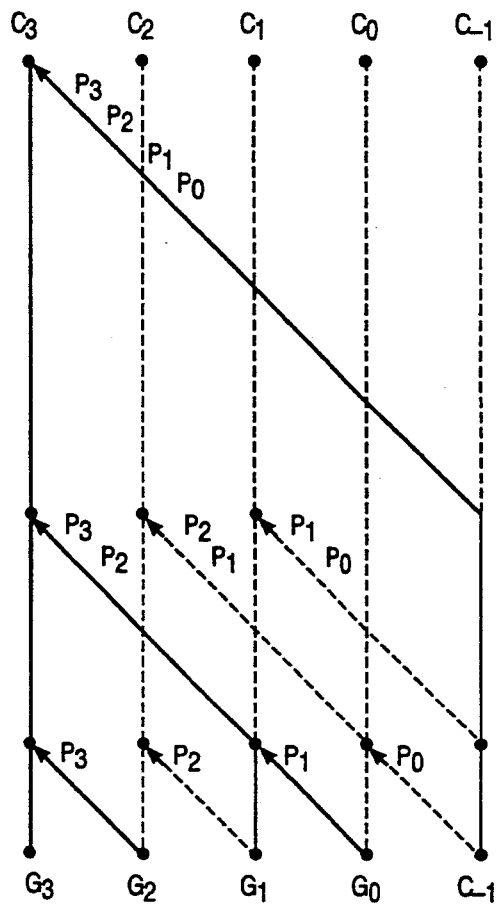
FIG_21
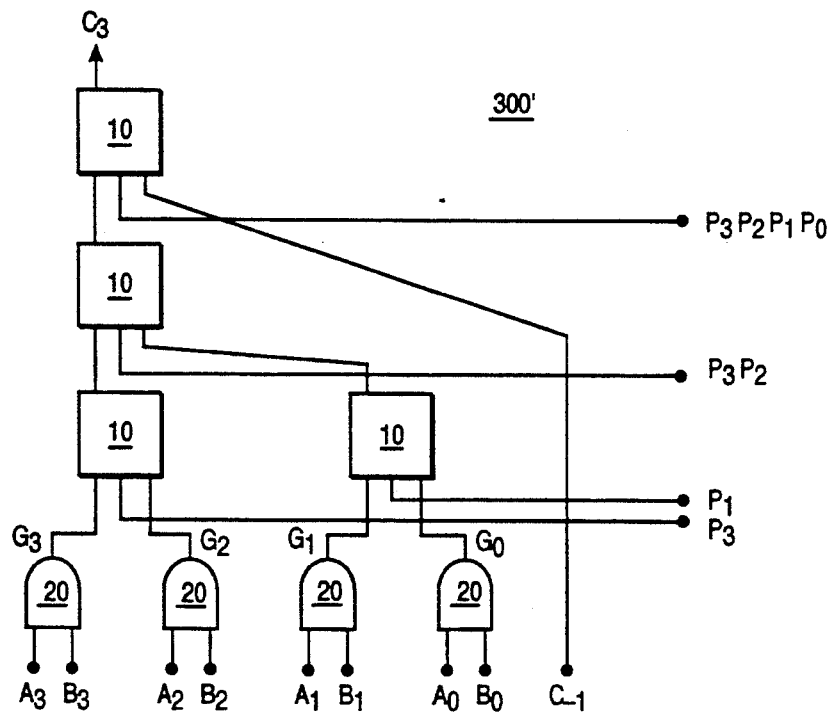

FIG_22
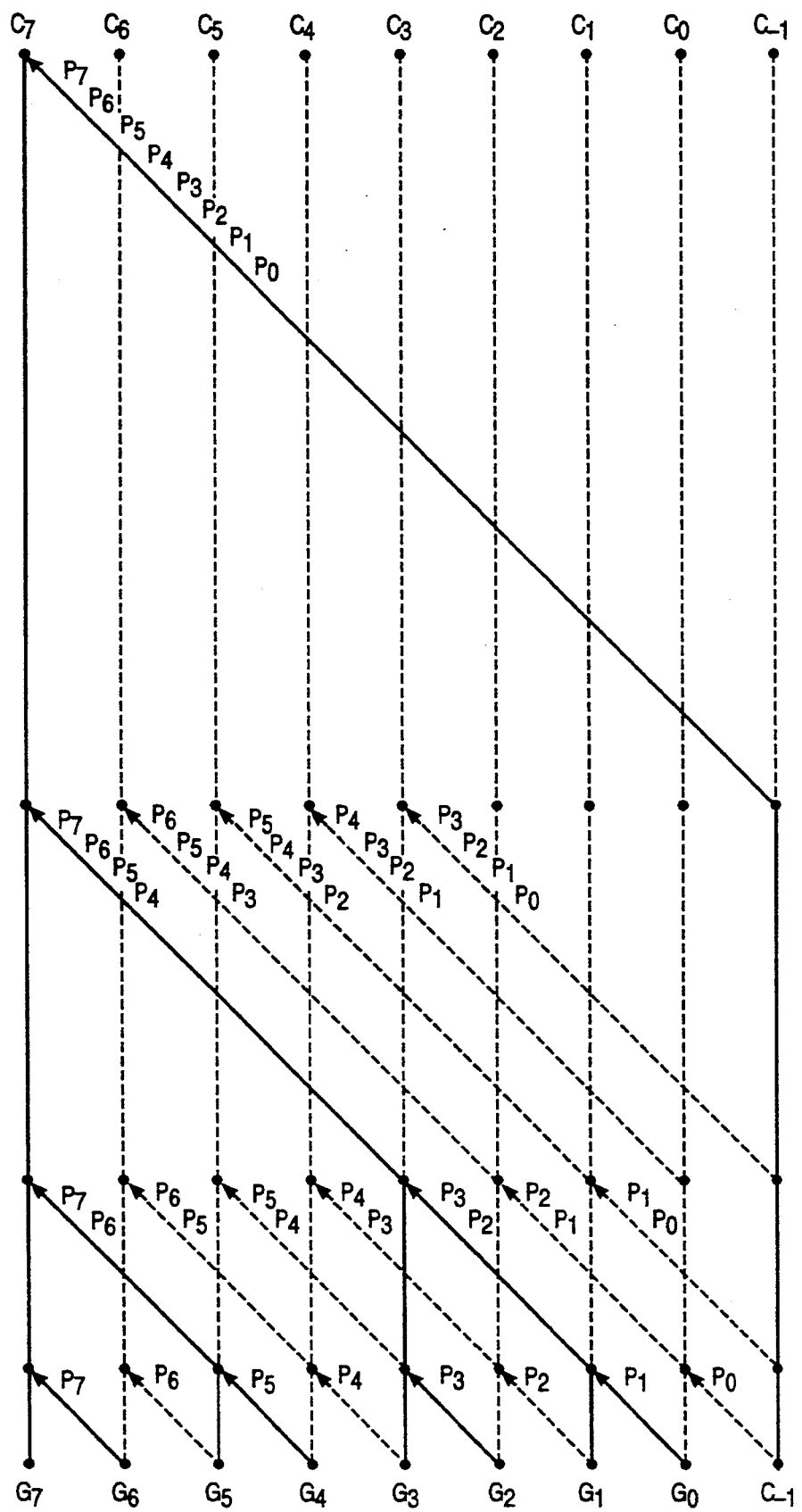

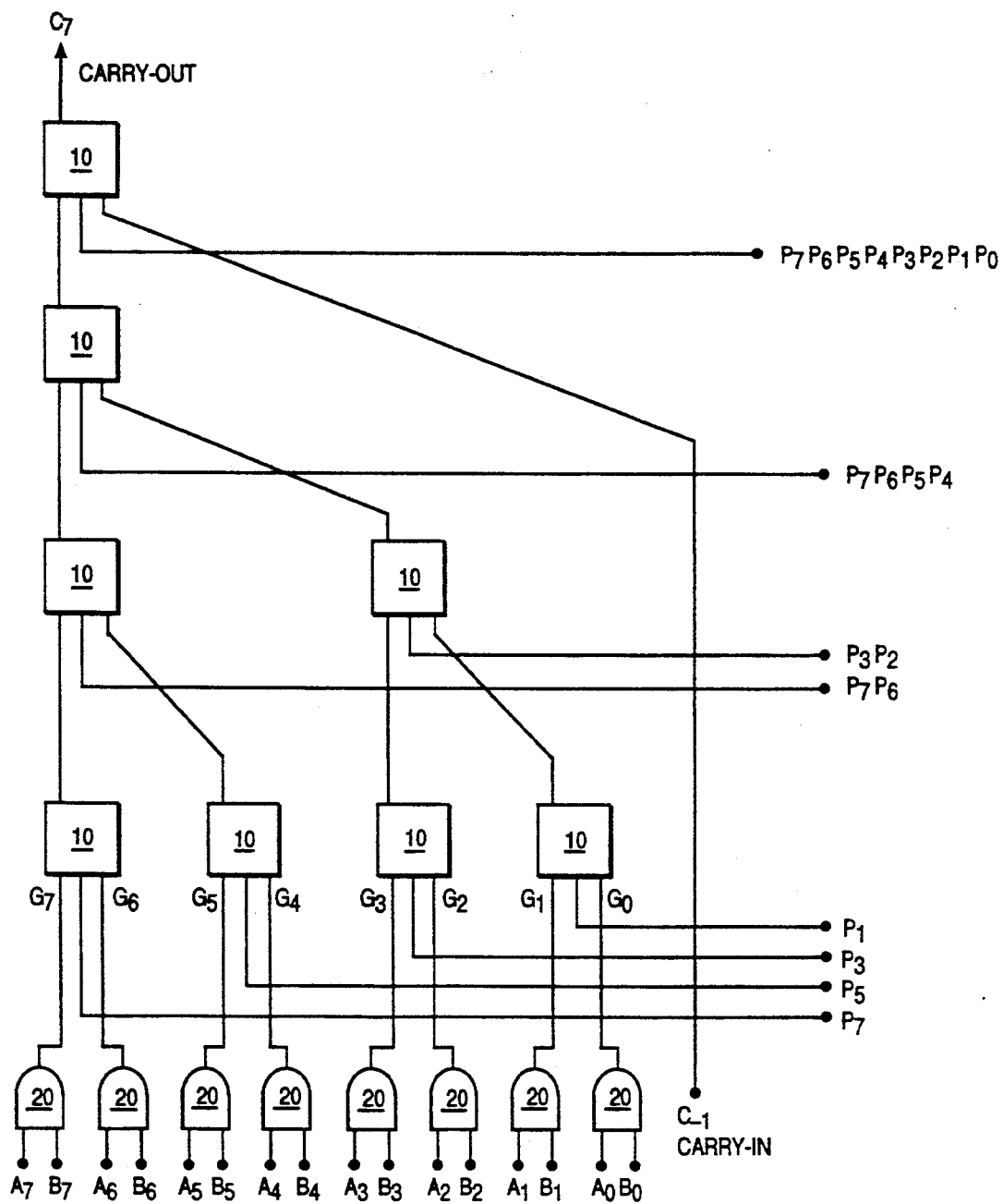
FIG_23

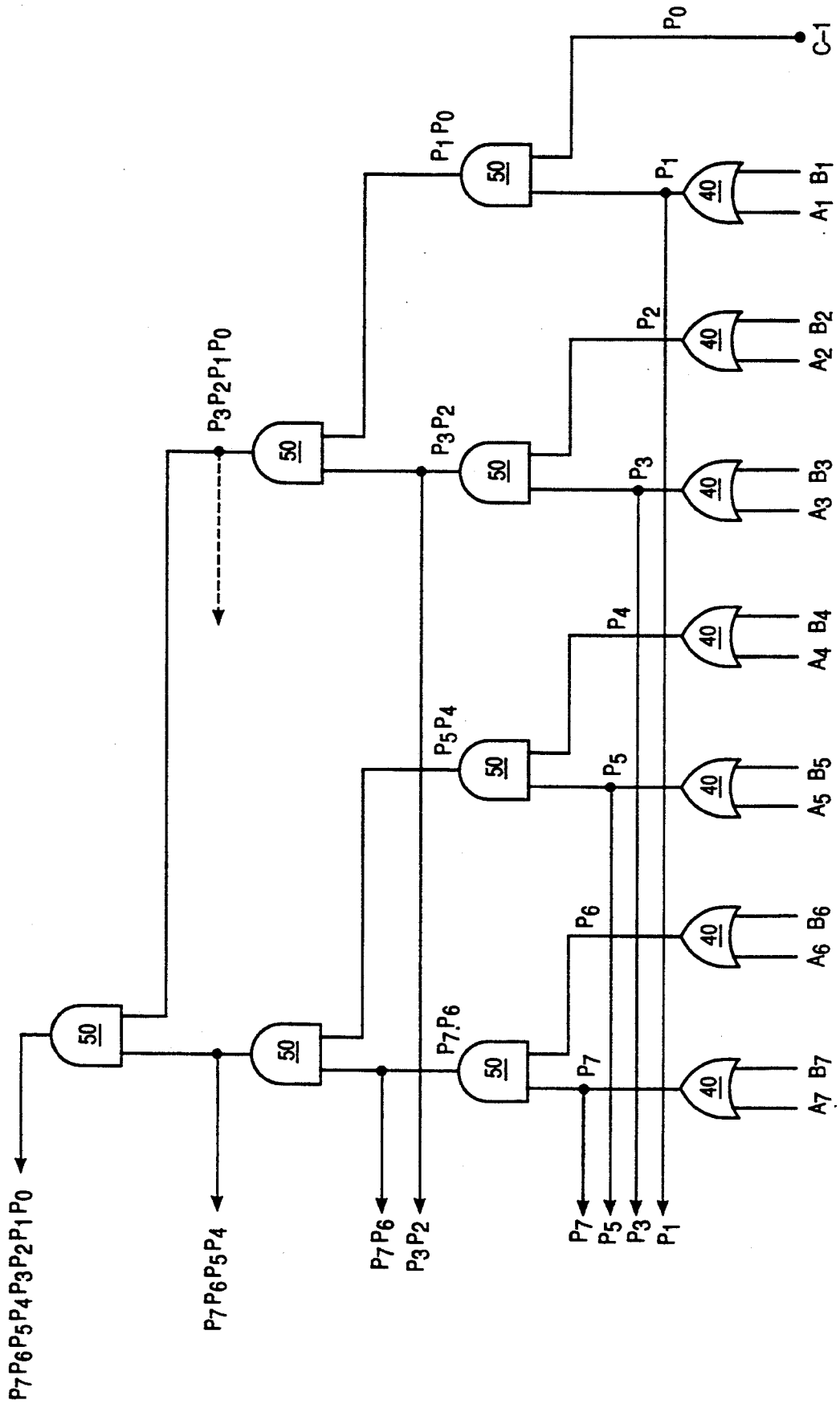
FIG_24

PARALLEL CARRY AND CARRY PROPAGATION GENERATOR APPARATUS FOR USE WITH CARRY-LOOK-AHEAD ADDERS

This is a continuation of application Ser. No. 07/820,304, filed Jan. 6, 1992, now abandoned.

FIELD OF INVENTION

The invention pertains to the field of arithmetic adder circuits and more specifically to binary adder networks.

BACKGROUND TO THE INVENTION

Binary adder networks are basic to digital computer arithmetic operation. Because of the large number of adder operations involved, the history of computer development shows a constant search for faster adder networks either through faster component technology or by improved network organization using various auxiliary logic or computing networks to augment the basic adder unit.

Early digital computers used ripple-carry adders in which the $i^{th}$ adder output bit may be represented by the modulo-2 bit sum $$S_i = A_i \oplus B_i \oplus C_{i-1}$$

where $A_i$ and $B_i$ are the $i^{th}$ bit of the input operands, and $C_{i-1}$ is the carry-in from the next lowest bit sum. The carry-in may be represented in terms of the prior stage operands $(A_{i-1}, B_{i-1})$ and the prior stage carry-in, $C_{i-2}$, as $C_{i-1} = A_{i-1}*B_{i-1} + C_{i-2}(A_{i-1}+B_{i-1})$ where $(*,+)$ are Boolean (AND, OR) operators respectively. The time for the carry-bits to ripple through became the limiting factor in the speed of adders. Subsequent fixed-time adders were introduced to overcome these deficiencies. These fixed-time adders may be classified into two categories: conditional sum and carry-look-ahead (CLA) adders.

Conditional adders compute each bit sum, $S_i$, twice: one sum, $S_{Ni}$, based on the assumption that the carry-in bit, $C_i$, is zero; a second sum, $S_{Ei}$, on the assumption that $C_i=1$. FIG. 1 is the logic diagram of a 4-bit-slice conditional sum adder. (Ref. "Introduction to Arithmetic", Waser and Flynn, Holt, Rinehart and Winston, 1982, p. 77ff). The two input operands are represented by input bits $A_0$, $A_1$, $A_2$, $A_3$ and $B_0$, $B_1$, $B_2$, $B_3$, respectively. Each pair of operand bits $(A_i, B_i)$ are applied to input terminals 110. $A_0$, $B_0$ correspond to the input operand least significant bit while $A_3$, $B_3$ correspond to the most significant bits. The conditional sum adder consists of two basic sections: the conditional sum generator unit 130 that forms at its output the two sets of conditional sums and conditional carry, $S_{N0}$, $S_{N1}$, $S_{N2}$, $S_{N3}$, $C_{N4}$ and $S_{E0}$, $S_{E1}$, $S_{E2}$, $S_{E3}$, $C_{E4}$, the latter group being based on the assumption of a non-zero carry-in to its corresponding individual conditional sum generator 141, 143, 145, 147, 149, respectively. These conditional signals are applied to conditional sum selector unit 150 consisting of the individual output selectors 161, 163, 165, 167, 169 corresponding to output sum bits $S_0$, $S_1$, $S_2$, $S_3$ and output carry bit $C_4$. The selection is controlled by the carry-in bit, $C_0$, and its complement, $\overline{C_0}$, operating on the conditional sums by means of AND-gates 113 and OR-gates 115.

The logic equations governing the behavior of the conditional 4-bit slice adder of FIG. 1 are as follows:

$$S_{N0} = A_0 \oplus B_0$$

$$S_{E0} = S_{N0}$$

$$S_{N1} = A_1 \oplus B_1 \oplus G_0$$

$$S_{E1} = A_1 \oplus B_1 \oplus P_0$$

$$S_{N2} = A_2 \oplus B_2 \oplus (G_1 + T_1 G_0)$$

$$S_{E2} = A_2 \oplus B_2 \oplus (G_1 + T_1 P_0)$$

$$S_{N3} = A_3 \oplus B_3 \oplus (G_2 + T_2 G_1 + T_2 T_1 G_0)$$

$$S_{E3} = A_3 \oplus B_3 \oplus (G_2 + T_2 G_1 + T_2 T_1 P_0)$$

$$C_{N4} = G_3 + T_3 G_2 + T_3 T_2 G_1 + T_3 T_2 T_1 G_0$$

$$C_{E4} = G_3 + T_3 G_2 + T_3 T_2 G_1 + T_3 T_2 T_1 P_0$$

where
$G_i = A_i B_i$,
$P_i = A_i B_i$,
$T_i = A_i \oplus B_i$.

The true 4-bit sum and carry-out is selected by selector unit 150 in accordance in accordance with the following boolean equations:

$$S_0 = S_{E0} C_0 + S_{N0} \overline{C_0}$$

$$S_1 = S_{E1} C_0 + S_{N1} \overline{C_0}$$

$$S_2 = S_{E2} C_0 + S_{N2} \overline{C_0}$$

$$S_3 = S_{E3} C_0 + S_{N3} \overline{C_0}$$

$$C_4 = C_{E4} C_0 + C_{N4}$$

The above concept could be extended to additional bits with the attendant increase in complexity implied by the above equations and by FIG. 1.

Carry-looks ahead (CLA) adders have been the most popular integrated circuit implementation in the recent past because of their simplicity and modularity. Modularity implies relative ease in extending the number of bits in each operand by the use of identical parallel units.

Consider, for example, the 4-bit slice CLA of FIG. 2. Comparison with FIG. 1, a 4-bit slice conditional adder, clearly shows the relative simplicity of the CLA.

The CLA sum may be expressed in the following logic expression as $$S_i = A_i \oplus B_i \oplus C_{i-1}, \quad i=0, 1, 2, 3$$

and the CLA carry as $$C_i + A_i B_i + C_i (A_i + B_i)$$

or $$C_i = G_i + P_i C_i$$

where $$G_i = A_i B_i$$

and $$P_i = A_i + B_i$$

The above CLA sum expression can be immediately evaluated, absent the carry term ($C_{i-1}$), by forming the EOR of the two operands ($A_i$, $B_i$). The carry term, $C_{i-1}$, is a function of lower order indexed operands, ($A_{i-1}$, $B_{i-1}$), and lower order carries, $C_{i-2}$. As a result, the time to complete an addition is generally governed by availability of the carry-in bit to each sum-bit.

The above expression for $C_i$ is a recursive equation, i.e., one in which the current value, $C_{i+1}$, is a function of its own past values. It may be explicitly stated as follows:

$$C_{i+1} = G_i + P_i G_{i-1} + P_i P_{i-1} G_{i-2} + \ldots + P_i P_{i-1} \ldots P_0 C_0$$

Hence, for the four-bit case of FIG. 2, the major output carry, C4, may be expressed as $$C_4 = G_3 + P_3 G_2 + P_3 P_2 G_1 + P_3 P_2 P_1 G_0 + P_3 P_2 P_1 P_0 C_0$$

By substituting the following into the above expression $$G_0' = G_3 + P_3 G_2 + P_3 P_2 G_1 + P_3 P_2 P_1 G_0$$

and $P_0' = P_3 P_2 P_1 P_0 C_0$ obtains $C_4 = G_0' + P_0' C_0$ which represents the logical expression for the $G_0', P_0'$ output terminals of FIG. 2.

If two networks of the type shown in FIG. 2 were to be used as a modular units for generating an 8-bit sum, the carry-in bit to the higher order 4-bit network, C4, would have to be formed in accordance with the above expression. The output carry of the higher order unit, C8, would then be expressible as $$C_8 = G_1' + P_1' G_0' + P_1' P_0' C_0$$

where $G'_1$ and $P'_1$ are the CLA output pair of the next higher order CLA modular unit.

Modularity was extended by means of a four group CLA generator that accommodated four CLA 4-bit slice adders and produced at output the necessary carry information, i.e., C4, C8, C12 and P", G", to form a 16-bit CLA adder using four modular adder units of the type shown in FIG. 2. FIG. 3 shows a four group CLA generator with four input pairs, ($G'_0, P'_0$), ($G'_1, P'_1$), ($G'_2, P'_2$) and ($G'_3, P'_3$) and carry outputs corresponding to C4, C8, C12 and (P", G"), where $$G_{12} = G'_2 + P'_2 G'_1 + P'_2 P'_1 G'_0 + P'_2 P'_1 P'_0 C_0$$

and $$G'' = G'_3 + P'_3 G'_2 + P'_3 P'_2 P'_1 C_0$$

$$P'' = P'_3 P'_2 P'_1 P'_0$$

Thus, the most significant carry-out bit, C16, could be logically formed as $$C_{16} = G'' + P'' C_0$$

and passed on, as needed, to higher order modular CLA adder units.

FIG. 4 shows the logical extension of modular CLA concept to 64-bit addition. A total of sixteen modular 4-bit slice SLA adders 200 are arrayed in parallel to accept input operand pairs, ($A_0$, $B_0$) . . . ($A_3$, $B_3$), ($A_4$, $B_4$) . . . ($A_7$, $B_7$), . . . , ($A_{60}$, $B_{60}$) . . . ($A_{63}$, $B_{63}$) and carry-in bits, ($C_0$, $C_{16}$, $C_{32}$, $C_{48}$), each producing 4-bit output sums, ($S_0$, $S_1$, $S_3$) . . . ($S_{60}$, $S_{61}$, $S_{62}$, $S_{63}$) and carry-generate/carry-propagate pairs ($P'_0, G'_0$), . . . ($P'_{15}, G'_{15}$).

A second logical level of four modular four group CLA generators 250, each accepting the carry output information of a corresponding group of four CLA adders 200, generates the necessary carry information for its associated adders 200 from the four pairs of carry-generate/carry-propagate pairs and the necessary carry-generate/carry-propagate pairs, [($P''_0, G''_0$), ($P''_1, G''_1$), and ($P''_2, G''_2$)], from which the third logic level consisting of a single CLA generator 250 generates the three additional carry-in bits, ($C_{16}$, $C_{32}$, $C_{48}$) supplied to the first and second levels. In this manner, modular 4-bit slice CLA adders have been used to accommodate higher precision operation.

Also, the basic conditional adder unit of FIG. 1 may be used as a modular adder and extended to higher precision addition by using the CLA generator concept because the logic equations defining the higher order carries are similar. For example, it may be shown (op cit Waser and Flynn) that the second level conditional same carries may be expressed as $$C_4 = C_{N4} + C_{E4} C_0$$

$$C_8 = C_{N8} + C_{E8} C_{N4} + C_{E8} C_{E4} C_0$$

$$C_{12} = C_{N12} + C_{E12} C_{N8} + C_{E12} C_{E8} C_{N4} + C_{E12} C_{E8} C_{E4} C_0$$

Because the logic required to implement the above expressions is identical to that of the CLA generator 250 of FIG. 3 and 4, a 16-bit adder may be implemented as shown in FIG. 5. The adder has four conditional adders 100 connected in parallel, each accepting 4-bit pairs of operands. Each adder 100 consists of a conditional sum generator 130 and a multiplexor 150. The modular group carry-out pairs, [($C_{N4}$, $C_{E4}$), ($C_{N8}$, $C_{E8}$), ($C_{N12}$, $C_{E12}$)], are supplied to CLA generator 250 which produces the modular carry-in bits (C4, C8, C12) required to form the sixteen bit addition. The extension required to accommodate more bits clearly indicated by the CLA method previously discussed.

Because of the need for cost effective parallel fast adders, it is highly desirable that the number of processing steps required to generate the carry-bits (and hence the sum) be proportional to the logarithm of the number of bits in each operand, and at a relatively low-cost. Also, a logic structure that allows constant fan-in and fan-out and permits static versus fixed rate pre-charge/-discharge operation is desirable. The present invention is designed to achieve these goals.

SUMMARY OF THE INVENTION

A parallel N-bit binary adder network is described comprising a multiplicity of parallel modulo-2 adders, each accepting and summing corresponding operand bit pairs and a final sum carry input. The final sum carry bits are generated in parallel by a carry generating network that comprises a parallel carry propagation logic array for generating carry propagation terms based on the logical OR-ing of pairs of input operand bits, a carry generation logic network based on AND-ing of pairs of input operand bits, and a logic array for operating on the carry generating and propagation terms, in parallel for producing a set of final sum carry terms that are fed in parallel to the modulo-2 parallel adders, or by using the most significant carry bit for selecting one of two sums in a conditional sum adder. The number of gate delays for generating the final set of N sum carry inputs to the modulo-2 adder is $[\log_2 2N]$, providing a substantial increase in adder throughput.

BRIEF DESCRIPTION OF THE DRAWINGS

FIG. 1 is a logic diagram of a prior art 4-bit slice conditional sum adder.

FIG. 2 is a logic diagram of a prior art 4-bit slice carry-look-ahead (CLA) adder.

FIG. 3 is a logic diagram of a prior art four group CLA generator.

FIG. 4 is a block diagram of a prior art 64-bit adder using full CLA.

FIG. 5 is a block diagram of a prior art 16-bit conditional sum adder using a four group CLA generator.

FIG. 6 is a flow diagram of a four-bit carry process.

FIG. 7 is a flow diagram of an eight-bit carry process.

FIG. 8 is a flow diagram of a sixteen-bit carry process.

FIG. 9 is a logic diagram for a typical carry generator node implementation.

FIG. 10 is a block diagram of an 8-bit carry generator.

FIG. 11 is a logic diagram for an 8-bit propagation generator.

FIG. 12 is a logic diagram for a one-bit adder with carry input.

FIG. 13 shows a block diagram of a complete parallel adder.

FIG. 14 shows the structure of an m-bit two-level carry generator module.

FIG. 15 shows the interconnections for a 16-bit carry-generator using 4-bit two-level modules.

FIG. 16 shows the partitioning of a 16-bit first and second level carry-generate matrix for use with 4-bit two-level modules.

FIG. 17 shows the partitioning of a 16-bit third and fourth level carry-generate matrix for use with 4-bit two-level modules.

FIG. 18 shows the interconnections for a 64-bit carry-generator using 8-bit two-level modules.

FIG. 19 shows a modular 24-bit using three 8-bit conditional adder networks.

FIG. 20 shows the flow diagram of a simplified 4-bit carry generator with an input carry-bit.

FIG. 21 shows a block diagram of a 4-bit carry generator corresponding to FIG. 20.

FIG. 22 shows the flow diagram for a simplified 8-bit carry generator.

FIG. 23 shows a block diagram of an 8-bit carry generator corresponding to FIG. 22.

FIG. 24 shows a block diagram of a simplified propagation generator.

DETAILED DESCRIPTION OF THE INVENTION

The sum, S, of two N-bit binary number operands (A,B) where $$A = A_{N-1}, A_{N-2}, \ldots, A_0$$

$$B = B_{N-1}, B_{N-2}, \ldots, B_0$$

may be expressed as $$S = S_1, S_{N-2}, \ldots, S_0$$

where $$S_i = A_i \oplus B_i \oplus C_{i-1}$$

represents the value of the $i_{th}$ sum bit expressed as the modulo-2 sum of the $i^{th}$ operand bit values (Ai, Bi) and the carry-in bit Ci−1, from the modulo-2 sum of the next least significant bit pair $(A_{i-1}, B_{i-1})$. Thus, by using the boolean logic operators (*) for "AND" and (+) for "OR", the carry bits may be expressed as $$C_0 = A_0 * B_0$$
$$C_1 = A_1 * B_1 + (A_1 + B_1) * C_0$$
$$C_2 = A_2 * B_2 + (A_2 + B_2) * C_1$$
$$\vdots$$
$$C_i = A_i * B_i + (A_i + B_i) * C_{i-1}$$
$$\vdots$$
$$C_{N-1} = A_{N-1} * B_{N-1} + (A_{N-1} + B_{N-1}) * C_{N-2}$$

For convenience, let $$G_i = A_i * B_i$$

$$P_i = A_i + B_i$$

so that the above carry bit expression become $$C_0 = G_0$$
$$C_1 = G_1 + P_1 C_0$$
$$C_2 = G_2 + P_2 C_1$$
$$\vdots$$
$$C_i = G$$
$$\vdots$$
$$C_{N-1} = G_{N-1} + P_{N+1} C_{N-2}$$

(Note that for further convenience, the explicit "AND" operator symbol has been omitted so that $P_i C_i = P_i * C_i$). This convention will be used throughout the following description.

The above recursive expressions may be expanded as follows:

$$C_0 = G_0$$
$$C_1 = G_1 + P_1 G_0$$
$$C_2 = G_2 + P_2 G_1 + P_2 P_1 G_0$$
$$C_3 = G_3 + P_3 G_2 + P_3 P_2 G_1 + P_3 P_2 P_1 G_0$$
$$C_4 = G_4 + P_4 G_3 + P_4 P_3 G_2 + P_4 P_3 P_2 G_1 + P_4 P_3 P_2 P_1 G_0$$
$$\vdots$$
$$C_i = G_i + P_i G_{i-1} + P_i P_{i-1} G_{i-2} + P_i P_{i-1} P_{i-2} G_{i-3} + \ldots + P_i P_{i-1} P_{i-2} \ldots P_i G_0$$
$$\vdots$$

This set of equations may, in turn, be expressed in matrix form as $$\begin{bmatrix} C_0 \\ C_1 \\ C_2 \\ C_3 \\ \vdots \\ C_i \\ \vdots \\ C_{N-1} \end{bmatrix} =$$

$$\begin{bmatrix} 1 & & & & & \\ P_1 & 1 & & & & \\ P_2P_1 & P_1 & 1 & & & \\ P_3P_2P_1 & P_2P_1 & P_1 & 1 & & \\ \vdots & \vdots & \vdots & & \ddots & \\ P_{N-1}P_{N-2}\ldots P_1 & P_{N-2}P_{N-3}\ldots P_1 & P_{N-3}P_{N-2}\ldots P_1 & \ldots & P_1 & 1 \end{bmatrix} \begin{bmatrix} G_0 \\ G_1 \\ G_2 \\ G_3 \\ \vdots \\ G_{N-1} \end{bmatrix}$$

or simply $$c = P^{(N)} g$$

where
  c is the carry column vector,
  g is the carry generator column vector, and
  $P^{(N)}$ is the lower triangular NXN carry propagation matrix.

Thus, $g = [G_0\ G_1\ G_2\ \ldots\ G_{N-1}]^T = [A_0B_0 A_1B_1 A_2B_2 \ldots A_{N-1}B_{N-1}]^T$ represents the "AND"-ing of operand bit pairs which generate a carry-out when high. Matrix P, whose elements represent propagation control variables, describes the means by which the carry-outs are propagated to and through higher order bits.

Significantly, the P-matrix may be factorized into the product of sparse lower triangular matrices. For example, $$P^{(3)} = \begin{bmatrix} 1 & & \\ P_1 & 1 & \\ P_2P_1 & P_1 & 1 \end{bmatrix} = \begin{bmatrix} 1 & & \\ 0 & 1 & \\ P_2P_1 & 0 & 1 \end{bmatrix} \cdot \begin{bmatrix} 1 & & \\ P_1 & 1 & \\ 0 & P_1 & 1 \end{bmatrix}$$

$$P^{(4)} = \begin{bmatrix} 1 & & & \\ P_1 & 1 & & \\ P_2P_1 & P_1 & 1 & \\ P_3P_2P_1 & P_2P_1 & P_1 & 1 \end{bmatrix}$$

$$= \begin{bmatrix} 1 & & & \\ 0 & 1 & & \\ 0 & 0 & 1 & \\ \pi_{1,3} & 0 & 0 & 1 \end{bmatrix} \begin{bmatrix} 1 & & & \\ 0 & 1 & & \\ \pi_{1,2} & 0 & 1 & \\ 0 & \pi_{2,3} & 0 & 1 \end{bmatrix} \begin{bmatrix} 1 & & & \\ \pi_{1,1} & 1 & & \\ 0 & \pi_{2,2} & 1 & \\ 0 & 0 & \pi_{3,3} & 1 \end{bmatrix}$$

where $\pi_{a,b} = P_a P_{a+1} P_{a+2} \ldots P_b$, and $\pi_{a,a} = P_a$ $$P^{(7)} = \begin{bmatrix} 1 & & & & & & \\ 0 & 1 & & & & & \\ 0 & 0 & 1 & & & & \\ \pi_{1,3} & 0 & 0 & 1 & & & \\ 0 & \pi_{2,4} & 0 & 0 & 1 & & \\ 0 & 0 & \pi_{3,5} & 0 & 0 & 1 & \\ 0 & 0 & 0 & \pi_{4,6} & 0 & 0 & 1 \end{bmatrix}.$$

$$\begin{bmatrix} 1 & & & & & & \\ 0 & 1 & & & & & \\ \pi_{1,2} & 0 & 1 & & & & \\ 0 & \pi_{2,3} & 0 & 1 & & & \\ 0 & 0 & \pi_{3,4} & 0 & 1 & & \\ 0 & 0 & 0 & \pi_{4,5} & 0 & 1 & \\ 0 & 0 & 0 & 0 & \pi_{5,6} & 0 & 1 \end{bmatrix}$$

$$\begin{bmatrix} 1 & & & & & & \\ \pi_{1,1} & 1 & & & & & \\ 0 & \pi_{2,2} & 1 & & & & \\ 0 & 0 & \pi_{3,3} & 1 & & & \\ 0 & 0 & 0 & \pi_{4,4} & 1 & & \\ 0 & 0 & 0 & 0 & \pi_{5,5} & 1 & \\ 0 & 0 & 0 & 0 & 0 & \pi_{6,6} & 1 \end{bmatrix}$$

$$P^{(8)} = \begin{bmatrix} 1 & & & & & & & \\ 0 & 1 & & & & & & \\ 0 & 0 & 1 & & & & & \\ 0 & 0 & 0 & 1 & & & & \\ 0 & 0 & 0 & 0 & 1 & & & \\ 0 & 0 & 0 & 0 & 0 & 1 & & \\ 0 & 0 & 0 & 0 & 0 & 0 & 1 & \\ \pi_{4,7} & 0 & 0 & 0 & 0 & 0 & 0 & 1 \end{bmatrix}.$$

$$\begin{bmatrix} 1 & & & & & & & \\ 0 & 1 & & & & & & \\ 0 & 0 & 1 & & & & & \\ \pi_{1,3} & 0 & 0 & 1 & & & & \\ 0 & \pi_{2,4} & 0 & 0 & 1 & & & \\ 0 & 0 & \pi_{3,5} & 0 & 0 & 1 & & \\ 0 & 0 & 0 & \pi_{4,6} & 0 & 0 & 1 & \\ 0 & 0 & 0 & 0 & \pi_{5,7} & 0 & 0 & 1 \end{bmatrix}.$$

$$\begin{bmatrix} 1 & & & & & & & \\ 0 & 1 & & & & & & \\ \pi_{1,2} & 0 & 1 & & & & & \\ 0 & \pi_{2,3} & 0 & 1 & & & & \\ 0 & 0 & \pi_{3,4} & 0 & 1 & & & \\ 0 & 0 & 0 & \pi_{4,5} & 0 & 1 & & \\ 0 & 0 & 0 & 0 & \pi_{5,6} & 0 & 1 & \\ 0 & 0 & 0 & 0 & 0 & \pi_{6,7} & 0 & 1 \end{bmatrix}.$$

$$\begin{bmatrix} 1 & & & & & & & \\ \pi_{1,1} & 1 & & & & & & \\ 0 & \pi_{2,2} & 1 & & & & & \\ 0 & 0 & \pi_{3,3} & 1 & & & & \\ 0 & 0 & 0 & \pi_{4,4} & 1 & & & \\ 0 & 0 & 0 & 0 & \pi_{5,5} & 1 & & \\ 0 & 0 & 0 & 0 & 0 & \pi_{6,6} & 1 & \\ 0 & 0 & 0 & 0 & 0 & 0 & \pi_{7,7} & 1 \end{bmatrix}$$

Thus, at each binary increment, $2^k \leq r < 2^{k+1}$, $P^{(r)}$ is factorizable into (k+1) lower triangle matrices of the form shown. These factorized equations may be represented by the flow diagrams of FIGS. 6, 7 and 8.

FIG. 6 corresponds to the four-bit carry generation process represented by the factorization of $P^{(4)}$. The input to the process consists of the carry-generator vector, $[G_0 G_1 G_2 G_3]^T$ shown at the bottom. The diagonal lines with arrow-heads correspond to multiple ("AND") operations on the data of the node of origin by the corresponding labelled expression. Unlabeled vertical lines between nodes represent transmission paths with no modification of data transmitted from a lower node to a higher node. All nodes are summing ("OR") junctions. For example, $C_1 = G_1 + P_1 G_0$ and $C_3 = P_3 P_2 (G_1 + P_1 G_0) + (G_3 + P_3 G_2) = P_3 P_2 P_1 G_0 + P_3 P_2 G_1 + P_3 G_2 + G_3$. The carry-out vector, $[C_0 C_1 C_2 C_3]^T$, is represented by the values present at the upper output nodes.

FIGS. 7 and 8 show flow diagrams for $P^{(8)}$ and $P^{(16)}$, respectively representing 8 and 16 bit carry generation processes. Clearly, flow diagrams for greater number of bits may be generated in a similar fashion by extending the principles expounded.

For each binary increment, $2^k \leq r \leq 2^{k+1} - 1$, or for each doubling of the number of bits used in the operands, one additional sparse lower triangular matrix is required to represent the factorized form of the $P^{(r)}$ matrix. Thus, for $2 \leq r \leq 3$, $P^{(r)}$ factors into 2 matrices; for $4 \leq r \leq 7$, $P^{(r)}$ factors into 3 matrices, and for $2^k \leq r \leq 2^{k+1} - 1$, $P^{(r)}$ factors into (k+1) matrices.

Each factorized matrix operation corresponds to a row of nodes shown in FIGS. 6, 7, and 8. The lowest (zero) level nodes correspond to the input carry generate vector values, g. The values at the next level of nodes corresponds to the column vector that would obtain if the extreme right hand factorized matrix of the examples given above were to operate on the input generate vector, g. Similarly, the second level of nodes has values corresponding to that which would obtain if the second most extreme right had factorized matrices operated on the vector resulting from product to its right. And so on for succeeding levels.

In general, k+1 factorized matrices (stages) are required for $2^{k+1}$ bits in each operand, i.e., [log$_2$N] stages for N-bit operands.

The flow diagrams of FIGS. 6, 7 and 8 also imply the logic network structures shown in FIGS. 9 through 11.

FIG. 9 represents a typical nodal processor 10 located at, say, node 1, k of FIG. 8 producing $G_{l,k}$ at its output. Processor 10 accepts as input operands $G_{l-1, k-2^{l-1}}$, $G_{l-1,k}$ and $P_k P_{k-1} \ldots P_{k-2^l-1}$ at its input terminals 11, 12 and 13 respectively. "AND"-gate 16 and "OR"-gate operate on these inputs to produce at output 14 the boolean function $$G_{l,k} = G_{l-1,k} + P_k P_{k-1} \ldots P_{k-2^l-1} G_{l-1,k-2^l-1}$$

FIG. 10 is an embodiment of an 8-bit carry generator having four rows (0-3) and 8 columns (0-7). Rows 1 through 3 comprises 7, 6 and 4 nodal processors 10, respectively, each of the type depicted in FIG. 9. Row 0 comprises 8 AND-gates 20 arranged to accept at input terminals 301 corresponding operand bit pairs, $\{A_k, B_k\}$, forming $G_{0,k} = A_k * B_k$ and supplied to processors 10 on line 11. The processors 10 of row 1 also accept the seven propagation variable $P_1$, through $P_7$ on input lines 305. Propagation variable $P_k$ being applied as an input to processor 10 located at row 1, column k on line 13 together with $G_{0,k-1}$ supplied by lines 12. The output of processor 10 located at 1,k is $$G_{1,k} = G_{0,k} + P_k G_{0,k-1}$$

In a similar manner, processors 10 of row 2 are supplied the outputs of row 1 together with propagation variable $P_{21}$ through $P_{76}$ from input line 307. The output of processor 10 located at 2, k is $$G_{2,k} = G_{1,k} + P_k P_{k-1} G_{1,k-2}$$

Processor 10 at location 3, k in a similar manner generates an output $$G_{3,k} = G_{2,k} + P_k P_{k-1} P_{k-2} P_{k-3} G_{2,k-4}$$

from inputs provided by lower level processors and propagation variable $P_4 P_3 P_2 P_1$ through $P_7 P_6 P_5 P_4$ supplied on input lines 309.

Carry output $C_0$ is available directly from AND-gate 20 at location 0,0 on line 303; $C_1$ from output line 14 of processor 10 at location 1,1; $C_2$ and $C_3$ from processors 10 at location 2,2, and 2,3 respectively; and $C_4$ through $C_7$ from row 3 processor 10 outputs.

It is clear, by reference to the flow diagrams of FIGS. 6, 7 and 8 and carry generator 300 of FIG. 10, that the architecture and organization of the 8-bit carry generator 300 may be expanded indefinitely adding an additional row each time the number of bits in each operand is doubled. The number of parallel processors required in each row is summarized in Table I.

TABLE I

| Row | \multicolumn{5}{c}{Operand Bits} |
|---|---|---|---|---|---|
| | 4 | 8 | 16 | 32 | 64 |
| 0 | 4 | 8 | 16 | 32 | 64 |
| 1 | 3 | 7 | 15 | 31 | 63 |
| 2 | 2 | 6 | 14 | 30 | 62 |
| 3 |   | 4 | 12 | 28 | 60 |
| 4 |   |   | 8 | 24 | 56 |
| 5 |   |   |   | 16 | 48 |
| 6 |   |   |   |   | 32 |

FIG. 11 is a logic circuit for implementing an 8-bit propagation generator suitable for supplying propagation variables to the 8-bit carry generator of FIG. 10. Propagation generator 400 comprises 7 OR-gates 40 in row 0 used to form propagation variables $P_1, P_2, \ldots P_7$ from input operand bit pairs $\{A_k, B_k\}$ as follows:

$$P_k = A_k + B_k$$

The set, $\{P_k\}$, is available on output lines 305. Subsequent rows are comprised of AND-gates 50. The $k^{th}$ AND-gate of row 1 accepts the $k^{th}$ and $k-1^{th}$ output of row 0 to form, at its output 307, $P_k P_{k-1}$. Similarly, the kth processor of row 2 accepts the $k^{th}$ and $k-2^{th}$ output of row 1 to form the set of propagation variables, $\{P_k P_{k-1} P_{k-2} P_{k-3}\}$, provided at output 309.

Clearly, the organization and architecture of processor 400 may be extended to accommodate more operand bits by extending the structure of FIG. 11 to the left and adding an additional row of AND-gates 50 each time the number of input operand bits are doubled. The number of gates required per row are indicated in Table II.

TABLE II

| Row | \multicolumn{5}{c}{Operand Bits} |
|---|---|---|---|---|---|
| | 4 | 8 | 16 | 32 | 64 |
| 0 | 3 | 7 | 15 | 31 | 63 |
| 1 | 2 | 6 | 14 | 30 | 62 |
| 2 |   | 4 | 12 | 28 | 60 |
| 3 |   |   | 8 | 24 | 56 |
| 4 |   |   |   | 16 | 48 |
| 5 |   |   |   |   | 32 |

FIG. 12 represents a logic network 60 for forming the complete bit sum of two operand bits ($A_k$, $B_k$) and a carry-in bit, Ck, comprising exclusive-or (EOR) networks 61 and 62. EOR network 61 forms the modulo-2 sum $A_k \oplus B_k$ and network 62 produces at its output $$S_k = A_k \oplus B_k \oplus C_{k-1}$$

Based on the preceding description of summer network 60, carry generator 300 and propagation generator 400; a complete parallel binary adder may be defined as shown in FIG. 13, organized to accept two N-bit operands;

$$A = A_0 A_1 A_2 \ldots A_{N-1}$$

$$B = B_0 B_1 B_2 \ldots B_{N-1}$$

Operands A and B are applied to the inputs of propagation generator 400, carry generator 300 and sum unit 500. Propagation generator 400 and carry generator 300 are configured in accordance with the prior description. Sum unit 500 comprises N one-bit plus carry-in bit EOR networks 60, each as described in FIG. 12. The carry-in to each EOR network 60 is provided by the appropriate output terminal of carry generator 300. Propagation variables are provided to carry generator 300 by propagation generator 400 as determined by the two input operands A and B. The output of sum unit 500 is $$S = S_0 S_1 \ldots S_{N-1}$$

where $$S_k = A_k \oplus B_k \oplus C_{k-1}$$

Note that carry $C_{N-1}$ is available at the output as an overflow bit of for use in extending the number of bits in the operands A and B.

The preferred implementation of carry generation 300 uses modular medium scale integrated circuit technology. For example, by properly sub-sectioning the flow graph of FIG. 8 into seven subsections as shown by the dotted outlines, a 4-bit wide and 2-level deep module may be defined that forms the basis for a modular building-block approach to the circuit implementation. The 4-bit wide partitioning is somewhat arbitrary and is mainly chosen for purposes of explanation because it probably represents the lowest level of modularization that allows the principle of modularity to be described.

FIG. 14 is a block diagram of an m-bit wide, 2-level module 500 comprising two layers of m nodal processors 10 of the type shown in FIG. 9. Five sets of m-input lines are accommodated: inputs 501 accept the corresponding I-level outputs, $\{G_{I,k}\}$; inputs 503 accept the I-level outputs displaced by $2^{I-1}$, $\{G_{I,k-2^{I-1}}\}$; inputs 505 and 507 accept the propagation carry-terms $$\left\{\pi_{k,k+2^{I+1}-1}\right\}$$

and $$\left\{\pi_{k,k+2^{I}-1}\right\},$$

respectively; and inputs 509 accept the $(I+1)^{th}$ inner layer output terms (displaced by $2^I$), $\{G_{I+1,k-2^I}\}$.

Two sets of output lines are provided: outputs 511 correspond to the first layer output terms, $\{G_{I+1,k}\}$; and outputs 513 are the second layer (or module) outputs, $\{G_{I+2,k}\}$.

FIG. 15 is an interconnection diagram for a carry generator 300 using 4-bit wide (m=4) 2-layer modules 500. Each logic unit 520 represents a set of four unit 20 AND-gates used to form $\{G_k\}$.

FIG. 15 may be best understood by referring to FIG. 16 that shows the matrix equation relating the zero level (I=0) inputs, $\{G_{0,k}\}$, to the second level (I=2) outputs, $\{G_{2,k}\}$, and to FIG. 17 showing the matrix equation relating the second level outputs to the fourth level outputs, $\{G_{4,k}\}$. In FIG. 16, the two 16×16 matrices ($P_1^{(16)}$, $P_2^{(16)}$) are each partitioned into 16 4×4 submatrices. Each non-zero valued submatrix corresponds to a single layer 4-bit wide operation performed within a 500 module. The submatrices of the right-hand matrix correspond to first layer operations while those in the left-hand matrix correspond to the second layer operations previously described. Similarly, the right hand set of submatrices in FIG. 17 corresponds to third level (I=3) operations and the left set corresponds to fourth level (I=4) operations. These equations provide interconnect information by relating the individual module 500 inputs to their outputs.

For example, consider the input/output relationship of module 500 in the first row of FIG. 15 identified by coordinates (1,3).

$$G_{2,8-11} = P_{2,32}^* P_{1,21} G_{0,0-3} + P_{2,32}^* P_{1,22}^* G_{0,4-7} +$$

$$P_{2,33} P_{1,32} G_{0,4-7} + P_{2,33} G_{0,8-11}$$

Because $P_{2,32}^* P_{1,21} = 0$ $$G_{2,8-11} = P_{2,32}^* P_{1,22} G_{0,4-7} + P_{2,33} P_{1,32} G_{0,4-7} + P_{2,33} G_{0,8-11} =$$

$$\begin{bmatrix} 0 & 0 & \pi_{7,8} & 0 \\ 0 & 0 & 0 & \pi_{8,9} \\ 0 & 0 & 0 & 0 \\ 0 & 0 & 0 & 0 \end{bmatrix} \begin{bmatrix} 1 & & & \\ \pi_{5,15} & 1 & & \\ 0 & \pi_{6,6} & 1 & \\ 0 & 0 & \pi_{7,7} & 1 \end{bmatrix} \begin{bmatrix} G_{0,4} \\ G_{0,5} \\ G_{0,6} \\ G_{0,7} \end{bmatrix} +$$

$$\begin{bmatrix} 1 & & & \\ 0 & 1 & & \\ \pi_{9,10} & 0 & 1 & \\ 0 & \pi_{10,11} & 0 & 1 \end{bmatrix} \begin{bmatrix} 0 & 0 & 0 & \pi_{8,8} \\ 0 & 0 & 0 & 0 \\ 0 & 0 & 0 & 0 \\ 0 & 0 & 0 & 0 \end{bmatrix} \begin{bmatrix} G_{0,4} \\ G_{0,5} \\ G_{0,6} \\ G_{0,7} \end{bmatrix} +$$

$$\begin{bmatrix} 1 & & & \\ 0 & 1 & & \\ \pi_{9,10} & 0 & 1 & \\ 0 & \pi_{10,11} & 0 & 1 \end{bmatrix} \begin{bmatrix} 1 & & & \\ \pi_{9,9} & 1 & & \\ 0 & \pi_{10,10} & 1 & \\ 0 & 0 & \pi_{11,11} & 1 \end{bmatrix} \begin{bmatrix} G_{0,8} \\ G_{0,9} \\ G_{0,10} \\ G_{0,11} \end{bmatrix}$$

Because $$\begin{bmatrix} G_{0,4} \\ G_{1,5} \\ G_{1,6} \\ G_{1,7} \end{bmatrix} = \begin{bmatrix} 1 & & & \\ \pi_{5,5} & 1 & & \\ 0 & \pi_{6,6} & 1 & \\ 0 & 0 & \pi_{7,7} & 1 \end{bmatrix} \begin{bmatrix} G_{0,4} \\ G_{0,5} \\ G_{0,6} \\ G_{0,7} \end{bmatrix}$$

and $$\begin{bmatrix} G_{0,8} \\ G_{1,9} \\ G_{1,10} \\ G_{1,11} \end{bmatrix} = \begin{bmatrix} 1 & & & \\ \pi_{9,9} & 1 & & \\ 0 & \pi_{10,10} & 1 & \\ 0 & 0 & \pi_{11,11} & 1 \end{bmatrix} \begin{bmatrix} G_{0,8} \\ G_{0,9} \\ G_{0,10} \\ G_{0,11} \end{bmatrix}$$

-continued $$G_{2,8-11} = \begin{bmatrix} 0 & 0 & \pi_{7,8} & 0 \\ 0 & 0 & 0 & \pi_{8,9} \\ 0 & 0 & 0 & 0 \\ 0 & 0 & 0 & 0 \end{bmatrix} \begin{bmatrix} G_{0,4} \\ G_{1,5} \\ G_{1,6} \\ G_{1,7} \end{bmatrix} +$$

$$\begin{bmatrix} 0 & 0 & 0 & \pi_{8,8} \\ 0 & 0 & 0 & 0 \\ 0 & 0 & \pi_{8,8} & \pi_{9,10} \\ 0 & 0 & 0 & 0 \end{bmatrix} \begin{bmatrix} G_{0,4} \\ G_{0,5} \\ G_{0,6} \\ G_{0,7} \end{bmatrix} +$$

$$\begin{bmatrix} 1 & & & \\ 01 & \pi_{9,10} & 010 & \pi_{10,11} & 01 \end{bmatrix} \begin{bmatrix} 1 & & & \\ \pi_{9,9} & 1 & & \\ 0 & \pi_{10,10} & 1 & \\ 0 & 0 & \pi_{11,11} & 1 \end{bmatrix} \begin{bmatrix} G_{0,8} \\ G_{0,9} \\ G_{0,10} \\ G_{0,11} \end{bmatrix}$$

This latter equation expresses the required inputs to module 500 (1,3): the first expression on the right implies only two non-zero products $$\pi_{7,8} \cdot G_{1,6} \text{ and } \pi_{8,9} \cdot G_{1,7}$$

thus requiring $$\pi_{7,8}, \pi_{8,9}, G_{1,6} \text{ and } G_{1,7}$$

as inputs; the second expression requires $$\pi_{8,8'} \pi_{9,10'}$$

and the third requires the input quadruplet $[G_{0,8} \; G_{0,9} \; G_{0,10} \; G_{0,11}]^T$, and the triplet $$\begin{bmatrix} \pi_{9,9'} & \pi_{10,10'} & \pi_{11,11} \end{bmatrix}.$$

Summarizing, the required inputs are: $G_{0,8-11}$, $G_{1,6-7}$, $G_{0,7}$, and $$\pi_{9-11,9-11'}$$

as shown in FIG. 15. (Please note that for FIG. 15, the output carries, $\{C_k\}$, are equal to $\{G_{4,k}\}$.)

A similar analysis for module 500 (2,4) results in the following expression:

$$\begin{bmatrix} C_{12} \\ C_{13} \\ C_{14} \\ C_{15} \end{bmatrix} = \begin{bmatrix} G_{4,12} \\ G_{4,13} \\ G_{4,14} \\ G_{4,15} \end{bmatrix} = \begin{bmatrix} \pi_{5,12} & G_{3,4} \\ \pi_{6,13} & G_{3,5} \\ \pi_{7,14} & G_{3,6} \\ \pi_{8,15} & G_{3,7} \end{bmatrix} +$$

$$\begin{bmatrix} \pi_{9,12} & G_{2,8} \\ \pi_{10,13} & G_{2,9} \\ \pi_{11,14} & G_{2,10} \\ \pi_{12,15} & G_{2,11} \end{bmatrix} + \begin{bmatrix} G_{2,12} \\ G_{2,13} \\ G_{2,14} \\ G_{2,15} \end{bmatrix}$$

The interconnections shown in FIG. 15 for module 500 (2,4) result.

FIG. 18 shows a simplified interconnection diagram for a 64-bit carry generator using 3-layers of 8-bit wide two layer modules. Specific details of the interconnections may be obtained by partitioning the carry-generator 300 matrices in the same manner as shown for the 4-bit wide two layer example. For the 64-bit case, however, three sets of equations, corresponding to the three layers of FIG. 18, must be used.

Another preferred embodiment using a slightly different concept of modularity is shown in FIG. 19. For purposes of explanation, a 24-bit adder network is shown comprising: three 8-bit conditional adder networks 141 each accepting two eight bit operands [($A_{0-7}$, $B_{0-7}$), ($A_{8-15}$, $B_{8-15}$), ($A_{16-23}$, $B_{16-23}$)], and each outputting two conditional 8-bit sums ($S_E$, $S_N$) as previously described in FIG. 1; multiplexer units 160 for selecting the $S_E$ or $S_N$ output of each conditional adder unit which is controlled by a two state carry signal; carry and propagation generator units 600 each comprising a carry generator 300' and propagation generator 400' for accepting two 8-bit operands and producing at its output the highest carry, say $C_7$, out of a possible set of ($C_0$, $C_1$, ..., $C_7$) for controlling its associated 2:1 MUX 160. Note that the lowest order (extreme right) MUX 160 is shown dotted so as to indicate that modularity consideration may require that each 8-bit conditional adder 141 be packaged with an associated MUX 160, in which case its control but would be set low because the absence of an input carry makes the $S_N$ output always valid. In effect, each of the three vertical grouping of units 141, 160 and 600 constitute a modular adder and carry-out generator 700 requiring its associated two fields of operand bits and carry-in bit. The tandem ensemble of these units makesup the complete adder. The output sum is represented by the 25-bit sum $S_{0-7}$, $S_{8-15}$, $S_{16-23}$, $S_{24}$.

In order to accommodate the carry-in bits (C−1, C7, C15) to units 600, a slight modification of the basic matrix and flow diagram must be made. Consider, the unit 600 shown on the extreme right of FIG. 19. The requisite matrix has the form $$\begin{bmatrix} C_{-1} \\ C_0 \\ C_1 \\ C_2 \\ C_3 \\ \vdots \\ \vdots \\ C_7 \end{bmatrix} =$$

$$\begin{bmatrix} 1 & & & & & & \\ P_0 & 1 & & & & & \\ P_0P_1 & P_1 & 1 & & & & \\ P_0P_1P_2 & P_1P_2 & P_2 & 1 & & & \\ P_0P_1P_2P_3 & P_1P_2P_3 & P_2P_3 & P_3 & 1 & & \\ \vdots & \vdots & \vdots & \vdots & & & \\ \vdots & \vdots & \vdots & \vdots & & & \\ P_0P_1\ldots P_7 & P_1P_2\ldots P_7 & P_2P_3\ldots P_7 & P_3P_4\ldots P_7 & P_4P_5\ldots P_7 & \ldots & 1 \end{bmatrix} \begin{bmatrix} C_{-1} \\ G_0 \\ G_1 \\ G_2 \\ G_3 \\ \vdots \\ \vdots \\ G_7 \end{bmatrix}$$

Note that if the carry-in, $C_{-1}$, is zero (non-existent), the first row and column are effectively zero. Also, $P_0 = C_{-1}$ so that $P_0$ and all its product terms vanish if $C_{-1} = 0$. Thus, when $C_{-1} = 0$, networks 300 and 400 are as previously defined. If $C_1 = 1$, then the form of the matrix, carry-generator network 300 and propagation generator 400 have the same logic structure as previously described.

For example, FIG. 20 shows the flow diagram corresponding to a 4-bit carry-generator 300 with an input carry bit $C_{-1}$, suitable for concatenating 4-bit conditional adder units in a similar fashion to that shown for 8-bit conditional adder units 141 in FIG. 19. The necessary steps required for generating the output carry, $C_3$, are shown by solid lines while the dotted-lines represent the other possible, but not required, processing steps previously shown. This implies the carry-out generator structure 300' shown in FIG. 21 using processing modules 10.

FIG. 22 and FIG. 23 are the corresponding flow diagram and simplified carry-out generator structure 300 for an 8-bit unit respectively, as used in the adder network of FIG. 19.

FIG. 24 shows a simplified block diagram for propagation generator 400' suitable for use with the 8-bit adder module 700 of FIG. 19. The subset of propagation terms required the 4-bit carry-out generator 300' ($P_3P_2P_1P_0$, $P_3P_2$, $P_3$, $P_1$) is also available from this unit.

The same flow diagram and logic networks are applicable to all concatenated units 600 of FIG. 19. However, in the case of the lowest significant unit 600 at the extreme right of FIG. 19, the carry-in from the previous stage is non-existent so that $C_{-1} = 0$. For the other stages, the carry-out of the previous section is used as the carry-in.

Clearly, the concept of modular carry propagation for extended operand precision, an example of which is shown in FIG. 19 is adaptable to the use of 4, 8, 16, .. . or any other size modular bit units by implementing units 600, 160 and 141 for the word size desired. Also, mixed systems in which associated units 600, 160, and 141 of a given 700 section, are of the same word size, but not necessarily the same word size the other 700 units tandemly connected with it, can be constructed.

These and other similar variations will become apparent to those versed in the art.

What is claimed is:

1. An N-bit two operand carry generator logic array operating on corresponding operand bit pairs comprising:

(a) a zero level (I=0) multiplicity of N gates in parallel for the logical AND-ing of the corresponding operand bit pairs producing at each gate output the carry term associated with the operand input bit pairs, said gate outputs being arranged in ascending order corresponding to the ascending order of significance of the operand input bit pairs;

(b) a carry generator processor having a first, second and third input, said first and second inputs connected to distinct partial carry terms of the next lower level and said third input connected to an associated propagation carry term provided by a carry propagation generator for producing at the processor output a next level partial carry input term;

(c) a first level (I=1) multiplicity of N-1 carry generator processors arranged in ascending order of significance, each processor having a first, second and third input, each said first input connected to one corresponding zero level gate output for all said N gate outputs except that associated with the least significant of the input bit pairs, said second input of each processor connected to the output of the zero level gate associated with the next lower significant operand bit pairs, each said third processor input connected to the corresponding zero level output of a carry propagation generator, producing at each processor output a partial first level carry term arranged in ascending order; and (d) additional higher levels (I=2, 3, . . . , L) of carry generator processors, each level having $N-2^{I-1}$ processors with each said first carry generator processor input connected to one corresponding next lower level carry generator processor output for all outputs in ascending order beginning at the $2^{I-1}$ output, said second input of each processor connected to the output of the next lower level processor at $2^{I-1}$ positions below the corresponding next lower level processor input to said first input, and said third processor input connected to a corresponding $I^{th}$ level carry propagation generator output.

2. An N-bit carry generator logic array as in claim 1 wherein said carry generator processor comprises:

(a) an OR-gate with an output and a first and second input, said first input connected to said processor first input, said OR-gate output being said processor output; and (b) an AND-gate with its output connected to said OR-gate second input, with a first and second input, said first input connected to said processor second input, and said second AND-gate input connected to said processor third input.

3. A carry generating network for N-bit operands comprising:

(a) an N-bit two operand carry generator logic array operating on corresponding operand bit pairs comprising:

(i) a zero level ($I=0$) multiplicity of N gates in parallel for the logical AND-ing of the corresponding operand bit pairs producing at each gate output the carry term associated with the operand input bit pairs, said gate outputs being arranged in ascending order corresponding to the ascending order of significance of the operand input bit pairs;

(ii) a carry generator processor having a first, second and third input, said first and second inputs connected to distinct partial carry terms of the next lower level and said first and said third input connected to an associated propagation carry term provided by a carry propagation generator for producing at the processor output a next level partial carry input term;

(iii) a first level ($I-1$) multiplicity of N-1 carry generator processors arranged in ascending order of significance, each processor having a first, second and third input, each said first input connected to one corresponding zero level gate output for all said N gate outputs except that associated with the least significant of the input bit pairs, said second input of each processor connected to the output of the zero level gate associated with the next lower significant operand bit pairs, each said third processor input connected to the corresponding zero level output of an N-bit carry propagation generator, producing at each processor output a partial first level carry term arranged in ascending order; and (iv) additional higher levels ($I=2,3,\ldots L$) of carry generator processors, each level having N-$2^{I-1}$ processors with each said first carry generator processor input connected to one corresponding next lower level carry generator processor output for all outputs in ascending order beginning at the $2^{I-1}$ output, said second input of each processor connected to the output of the next lower level processor at $2^{I-1}$ positions below the corresponding next lower level processor input to said first input, and said third processor input connected to a corresponding $I^{th}$ level N-bit carry propagation generator output; and (b) an N-bit carry propagation generator for providing multilevel ordered propagation terms to said carry generator, with multiple level output propagation terms, and its outputs connected to corresponding same level carry generator processors.

4. A carry generating network as in claim 3 wherein said N-bit carry propagation generator further comprises:

(a) a zero level ($I=0$) multiplicity of N-1 gates for the logical OR-ing of the two operand corresponding bit pairs for all bit pairs except the least significant, producing at each gate output, its associated first level conditional carry term arranged in ascending order of the operand bit pair inputs;

(b) a first level ($I=1$) multiplicity of N-2 AND-gates, each said gate accepting as inputs adjacent overlapping ascending order outputs producing an ordered ascending set of second level conditional carry terms; and (c) additional higher levels of AND-gates, each succeeding level having N-$2^I$ AND-gates, each said gates having a first input connected its corresponding lower level ordered output and second input connected to the $2^{Ith}$ lesser ordered output of said lower level, for forming the required higher level up to and including level, $I=L$, for which $2^I=N/2$; each level producing succeeding higher order conditional carry terms at the individual AND-gate outputs.

5. A carry-look-ahead modular adder network comprising:

(a) a modular adder unit comprising:

(i) input means for accepting two N-bit operands and a carry-in bit;

(ii) a conditional sum adder connected to said input means for forming two conditional operand sums based on the two possible states of the carry-in bit; and (iii) a carry generating network with its input connected to said input means for generating a carry-out bit from the two operands and carry-in bit, said carry generating network comprising:

an N-bit two operand carry generator logic array operating on corresponding operand bit pairs comprising;

a zero level ($I=0$) multiplicity of N gates in parallel for the logical AND-ing of the corresponding operand bit pairs producing at each gate output the carry term associated with the operand input bit pairs, said gate outputs being arranged in ascending order corresponding to the ascending order of significance of the operand input bit pairs;

a carry generator processor having a first, second and third input, said first and second inputs connected to distinct partial carry terms of the next lower level and said first and said third input connected to an associated propagation carry term provided by a carry propagation generator for producing at the processor output a next level partial carry input term;

a first level ($I-1$) multiplicity of N-1 carry generator processors arranged in ascending order of significance, each processor having a first, second and third input, each said first input connected to one corresponding zero level gate output for all said N gate outputs except that associated with the least significant of the input bit pairs, said second input of each processor connected to the output of the zero level gate associated with the next lower significant operand bit pairs, each said third processor input connected to the corresponding zero level output of an N-bit carry propagation generator, producing at each processor output a partial first level carry term arranged in ascending order;

additional higher levels (I=2,3, ... L) of carry generator processors, each level having N-$2^{I-1}$ processors with each said first carry generator processor input connected to one corresponding next lower level carry generator processor output for all outputs in ascending order beginning at the $2^{I-1}$ output, said second input of each processor connected to the output of the next lower level processor at $2^{I-1}$ positions below the corresponding next lower level processor input to said first input, and said third processor input connected to a corresponding $I^{th}$ level N-bit carry propagation generator output; and an N-bit carry propagation generator for providing multilevel ordered propagation terms to said carry generator, with multiple level output propagation terms, and its outputs connected to corresponding same level carry generator processors; and (b) a multiplicity of said modular adder units connected in tandem in ascending order of significance so that the operand bit fields are partitioned into corresponding non-overlapping operand subfields, each subfield of increasing significance being assigned to the tandem modular adder units in ascending order of significance so that the sum from each modular adder is a corresponding subfield of the operand sum and the carry-in bit to each modular adder unit is the carry-out bit of the previous modular adder unit.

6. A carry-look-ahead modular adder network comprising:

(a) input means for accepting two N-bit operands;

(b) a multiplicity of N one-bit conditional sum adders, each having a sum select input, each connected to the input means to a distinct pair of corresponding bits of the two operands for forming a conditional sum of each corresponding operand bit pairs ordered in ascending significance; and (c) a carry generating network operating on the two N-bit operands, for generating at its output a multi-bit field or ordered carry-bits, ordered to correspond to the conditional sum select input bit of said conditional sum adders, each succeeding higher order carry generator output bit connected to the succeeding sum select input of said multiplicity of ordered one-bit conditional adders thereby producing at the output of the ordered conditional sum adders a field of bits corresponding to the sum of the two N-bit operands, said carry generating network comprising;

an N-bit two operand carry generator logic array operating on corresponding operand bit pairs comprising;

a zero level (I=0) multiplicity of N gates in parallel for the logical AND-ing of the corresponding operand bit pairs producing at each gate output the carry term associated with the operand input bit pairs, said gate outputs being arranged in ascending order corresponding to the ascending order of significance of the operand input bit pairs;

a carry generator processor having a first, second and third input, said first and second inputs connected to distinct partial carry terms of the next lower level and said first and said third input connected to an associated propagation carry term provided by a carry propagation generator for producing at the processor output a next level partial carry input term;

a first level (I−1) multiplicity of N-1 carry generator processors arranged in ascending order of significance, each processor having a first, second and third input, each said first input connected to one corresponding zero level gate output for all said N gate outputs except that associated with the least significant of the input bit pairs, said second input of each processor connected to the output of the zero level gate associated with the next lower significant operand bit pairs, each said third processor input connected to the corresponding zero level output of an N-bit carry propagation generator, producing at each processor output a partial first level carry term arranged in ascending order;

additional higher levels (I=2, 3, ... L) of carry generator processors, each level having N-$2^{I-1}$ processors with each said first carry generator processor input connected to one corresponding next lower level carry generator processor output for all outputs in ascending order beginning at the $2^{I-1}$ output, said second input of each processor connected to the output of the next lower level processor at $2^{I-1}$ positions below the corresponding next lower level processor input to said first input, and said third processor input connected to a corresponding $I^{th}$ level N-bit carry propagation generator output; and an N-bit carry propagation generator for providing multilevel ordered propagation terms to said carry generator, with multiple level output propagation terms, and its outputs connected to corresponding same level carry generator processors.

7. A carry-look-ahead modular adder as in claim 6 wherein each of the one-bit conditional sum adders comprises:

(a) a first exclusive-or network connected to an operand bit pair of said input means for forming the modulo-2 sum of corresponding bit pairs of the two operands at its output that is representative of the first conditional sum; and (b) a second exclusive-or network with an output, and a first and second input, the first input connected to the output of said first exclusive-or network, the second input connected to the corresponding carry generator output bit for use as a carry-in conditional sum select bit by forming the complement of said first exclusive-or first conditional sum which is representative of the second conditional sum and selecting the appropriate sum as determined by the state of the carry-in bit, the output being representative of the sum of the two operand bits and the carry-in bit.

8. A carry-look-ahead modular adder as in claim 6 wherein said input means further comprises means for accepting a least significant carry-in bit and connecting the carry-in bit to the carry-in sum select input of the least significant one-bit conditional adder.

9. A carry-look-ahead modular adder as in claim 6 wherein the least significant one-bit conditional sum adder is an unconditional adder.

10. A simplified N-bit operand carry generator logic array for use with carry-look-ahead conditional sum adders with a carry-in, comprising:
  (a) a carry propagation generator for generating carry propagation terms from the two N-bit operands and an input carry;
  (b) a zero-level (I=0) multiplicity of N gates in parallel for the logical AND-ing of corresponding operand bit pairs producing at each gate output the carry term associated with the corresponding input operand bit pair, the N outputs being arranged in ascending order (0, 1, 2, . . . , N-1) corresponding to the ascending order of the associated operand bit pairs;
  (c) a carry generator processor having a first, second and third input, said first and second inputs connected to distinct partial carry terms of the next lower level and said third input connected to an associated propagation carry term provided by a carry propagation generator for producing at its output a next level partial carry input term;
  (d) a first level (I=1) multiplicity of N/2 carry generator processors arranged in ascending order of significance, each first input of said processors connected to one odd order (n=1, 3, 5, . . . , N-1) gate output, each second input of said processors connected to the output of the zero level gate associated with the next least significant gate output (0, 2, 4, . . . , N-2), each third input of said processors connected to the corresponding zero level output of said carry propagation generator, producing at each processor output a partial carry term of second order arranged in ascending order;
  (e) additional higher levels (I=2, 3, L=log$_2$N, . . . , L) of carry generator processors, each level up to L=log$_2$N having $2^{-I}$N carry generator processors with each first input connected to one corresponding next lower level processor output, each second input connected to the output of the next lower level processor at $2^{I-1}$ positions below the corresponding next lower level processor, and the third input connected to the corresponding I$^{th}$ level carry propagation generator output; and
  (f) a final, highest level (I=L+1) comprising a single carry generator processor with the first input connected to the output of the next lower level processor, the second processor input connected to the carry-in bit, and the third processor input connected to the corresponding L+1 level carry propagation output term, thereby producing a single output carry bit corresponding to the output carry resulting from the sum of the two operands and the carry-in bit.

11. A two level carry generating module for generating two levels (I=m, m+1) of carry generator terms, comprising:
  (a) a first set of input terminals for accepting corresponding m−1 level partial carry output terms;
  (b) a second set of input terminals for accepting associated displaced m−1 level partial carry output terms;
  (c) a third set of input terminals for accepting associated m level propagation carry terms;
  (d) a fourth set of input terminals for accepting associated displaced m level partial carry output terms;
  (e) a fifth set of input terminals for accepting associated m+1 level propagation carry terms;
  (f) a first set of output terminals for outputting the m level partial carry terms;
  (g) a second set of output terminals for outputting the (m+1) level partial carry terms;
  (h) a carry generator processor comprising:
    i) an OR-gate with an output and a first and second input, said first input connected said processor first input, said OR-gate output being said processor output;
    ii) an AND-gate with its output connected to said OR-gate second input, with a first and second input, said first input connected to said processor second input, and said second AND-gate input connected to said processor third input;
  (i) a multiplicity of said carry generator processors comprising an m level set of processors, said first input of each processor connected to a corresponding terminal of said first set of input terminals, said second input of each processor connected to a corresponding terminal of said second set of input terminals, and said third input of each processor connected to a corresponding terminal of said third set of input terminals, said output of each processor connected to a corresponding terminal of said first set of output terminals; and
  (j) a multiplicity of said carry generator processors comprising an (m+1) level set of processors, said first input of each processor connected to the output of a distinct corresponding m−1 level processor, said second input of each processor connected to a corresponding terminal of said fourth set of input terminals, said third input of each processor connected to a corresponding terminal of said fourth set of input terminals, said third input of each processor connected to a corresponding terminal of said fifth set of input terminals, said output terminal of each processor connected to a corresponding output of said second set of output terminals.

* * * * *